United States Patent
Persinger

(10) Patent No.: US 7,984,145 B2
(45) Date of Patent: Jul. 19, 2011

(54) NOTIFICATION OF SUSPICIOUS ELECTRONIC ACTIVITY

(75) Inventor: James B. Persinger, Atlanta, GA (US)

(73) Assignee: PM Investigations, Inc., Atlanta, GA (US)

( * ) Notice: Subject to any disclaimer, the term of this patent is extended or adjusted under 35 U.S.C. 154(b) by 101 days.

(21) Appl. No.: 12/357,069

(22) Filed: Jan. 21, 2009

(65) Prior Publication Data

US 2009/0193075 A1    Jul. 30, 2009

Related U.S. Application Data

(60) Provisional application No. 61/023,221, filed on Jan. 24, 2008.

(51) Int. Cl.
*G06F 15/173* (2006.01)
(52) U.S. Cl. .......... 709/224; 709/205; 709/206
(58) Field of Classification Search .......... 709/203, 709/224
See application file for complete search history.

(56) References Cited

U.S. PATENT DOCUMENTS

| | | | |
|---|---|---|---|
| 2004/0111479 A1* | 6/2004 | Borden et al. | 709/206 |
| 2006/0277053 A1* | 12/2006 | Lobb et al. | 705/1 |
| 2008/0244704 A1* | 10/2008 | Lotter et al. | 726/3 |

* cited by examiner

*Primary Examiner* — Andrew Caldwell
*Assistant Examiner* — Bryan Lee
(74) *Attorney, Agent, or Firm* — Thomas, Kayden, Horstemeyer & Risley, LLP.

(57) ABSTRACT

Included are embodiments for notifying of electronic activity. One embodiment of a method, among others, includes receiving from a client an indication of a suspicious electronic activity, the client being associated with a user, gathering data related to the suspicious electronic activity, and calculating a frequency of appearance of at least one keyword within the data. Some embodiments include determining that the data is related to an undesirable incident based on whether the frequency of appearance meets a threshold and notifying at least one predetermined recipient of the undesirable incident.

13 Claims, 22 Drawing Sheets

I.C.I.E. MANAGEMENT CONSOLE

USER MANAGEMENT | FILE MANAGEMENT | AD MANAGEMENT | CHANGE PASSWORD | LOGOUT

| ID 1603 | COMPUTER NAME 1605 | ZIP CODE 1607 | INFORMATION 1609 | HTML FILE 1611 | TIME 1613 | 1615 |
|---|---|---|---|---|---|---|
| ○ | GHOST | 11111 | VIEW INFORMATION | VIEW HTML FILE | 01/07/2008 17:32 | DOWNLOAD ZIP |
| ○ | FOO | 22222 | VIEW INFORMATION | VIEW HTML FILE | 01/05/2008 20:16 | DOWNLOAD ZIP FILE |
| ○ | BAR | 33333 | VIEW INFORMATION | VIEW HTML FILE | 01/03/2008 7:27 | DOWNLOAD ZIP FILE |
| ○ | ALPHA | 44444 | VIEW INFORMATION | VIEW HTML FILE | 01/01/2008 14:57 | DOWNLOAD ZIP FILE |
| ○ | BETA | 55555 | VIEW INFORMATION | VIEW HTML FILE | 12/30/2007 14:57 | DOWNLOAD ZIP FILE |

FIG. 16

NOTIFICATION OF SUSPICIOUS ELECTRONIC ACTIVITY

CROSS REFERENCE

This application claims priority to U.S. Provisional Application No. 61/023,221, filed Jan. 24, 2008, which is hereby incorporated into this application in its entirety.

BACKGROUND

Internet users are often subject to illegal, dangerous, and/or suspicious activities. As a nonlimiting example, minors and others may encounter child predators, disturbed, suicidal, and/or homicidal people both on the Internet and in everyday life. However, there have been limited avenues for people to protect their safety and the safety of others, while notifying the proper authorities. Further, parents, guardians, and/or other individuals who are responsible for Internet users are often confused as to whom they should notify when these activities and/or events are encountered.

SUMMARY

Included are embodiments for notifying of electronic activity. One embodiment of a method, among others, includes receiving from a client an indication of a suspicious electronic activity, the client being associated with a user, gathering data related to the suspicious electronic activity, and calculating a frequency of appearance of at least one keyword within the data. Some embodiments include determining that the data is related to an undesirable incident based on whether the frequency of appearance meets a threshold and notifying at least one predetermined recipient of the undesirable incident.

Also included are embodiments of a system for notifying of electronic activity. One embodiment, among others, includes at least one server that stores a notification application executable on the at least one server, the notification application configured to perform at least the following: receive an indication of a suspicious electronic activity from a client device, the client device being associated with a user and a location; gather data related to the suspicious electronic activity and the client device; determine at least one keyword identified for the location; calculate a frequency of appearance of the at least one keyword within the data; determine whether the data is related to a suspicious activity based on whether the frequency of appearance meets a predetermined threshold; and notify at least one predetermined recipient of the suspicious activity.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 16 illustrates an exemplary embodiment of a file management page such as may be provided by the server 106a from FIG. 1.

DETAILED DESCRIPTION

As Internet users participate in various Internet activities, the chances of encountering illicit and/or suspicious activity increase. As a nonlimiting example, many users may participate in chat rooms, instant messaging, text messaging, MySpace™, Facebook™, and/or other community Internet activities on a personal computer, laptop computer, mobile telephone, and/or other computing device. During these activities, the Internet user may encounter child predators, suicidal users, destructive users and/or others who may cause harm to themselves and/or others.

As such, embodiments disclosed herein include techniques for providing users with the ability to report suspicious and/or illegal activities encountered. As a nonlimiting example, if a user encounters a potential child predator, the user may select a reporting option, such as an "In Case of Internet Emergency" (ICIE™) option on a toolbar and/or on a web page. The reporting option may be configured to capture data on the web page that the user is currently viewing and/or other data from a client device. At least a portion of this data may be sent to a parent/guardian via an email, text message, and/or via other messaging techniques.

Additionally, the captured data may be compiled and sent to a monitoring center, where the captured data is compared with one or more pieces of trigger data to determine the type of situation and/or whether a threshold has been met to contact the authorities. The trigger data and threshold may be configurable by federal law enforcement, local law enforcement, and/or other third parties. As a nonlimiting example, if the captured data indicates that there is a predetermined probability (e.g., 70% chance) that the Internet communication indicates a potentially undesirable situation (e.g., a suicide victim), at least a portion of the data may be sent to third party (e.g., a suicide center) to address this issue. Similarly, if the captured data indicates that there is a 75% chance that the communication is with a child predator, at least a portion of the data may be sent to federal law enforcement, local law enforcement, and/or other authorities. Other embodiments are also described. Each instance captured data reaches a 10% or greater (for example) mark over the listed threshold value, said notification to such third party would be indicated as a HIGH in the alert subject line of that instance's notification alert.

Figure 1:
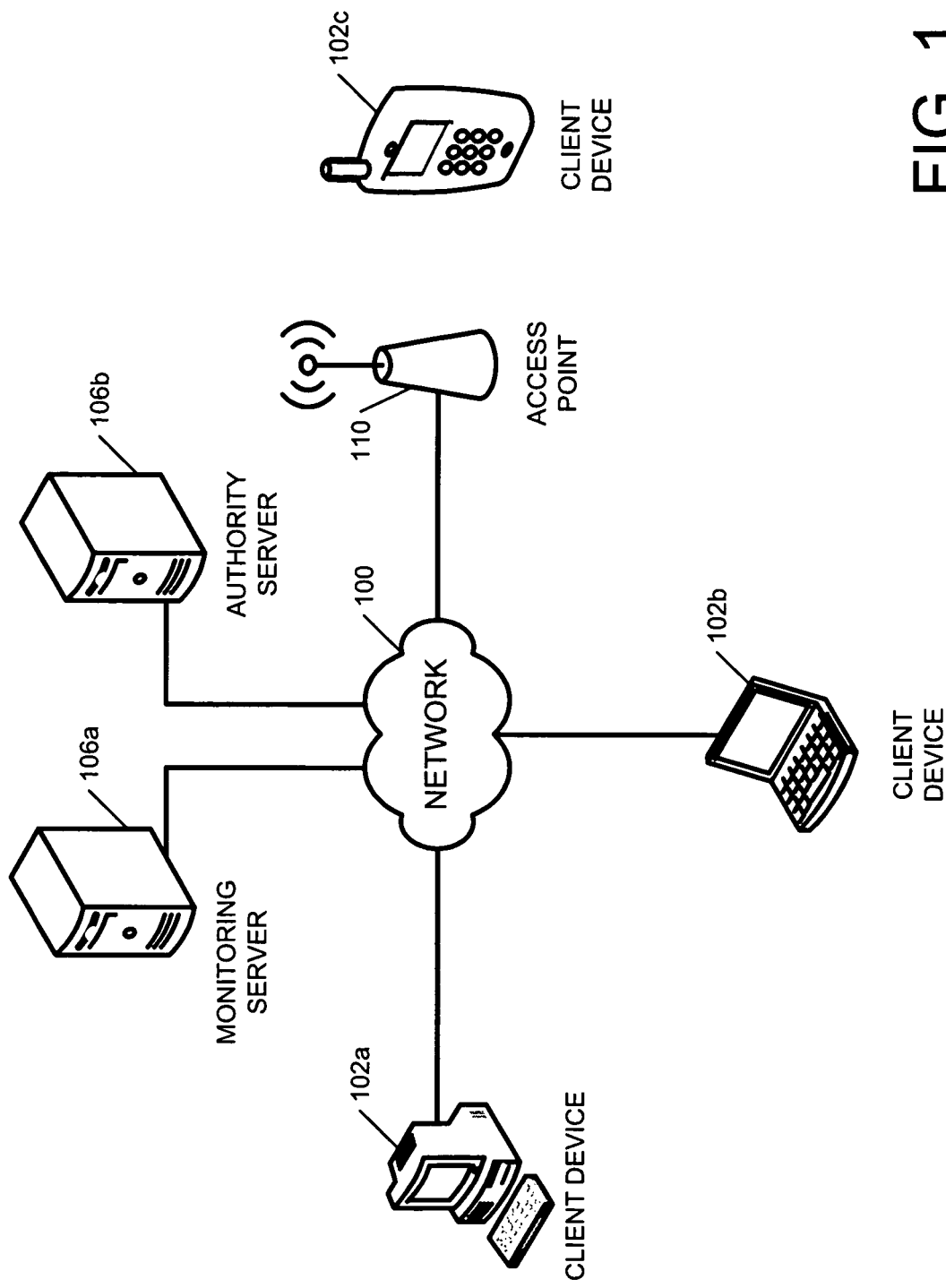
FIG. 1 illustrates an exemplary embodiment of a communications network that may be configured to facilitate communication of data.

Referring to the drawings, FIG. 1 illustrates an exemplary embodiment of a communications network that may be configured to facilitate communication of data. More specifically, as illustrated in the nonlimiting example of FIG. 1, a network 100 may be utilized and include a wide area network (WAN), such as the Internet, a public switched telephone network (PSTN), mobile communications network (MCN), and/or other network. Similarly, the network 100 may include a wireline and/or a wireless local area network (LAN). Regardless of the communications medium and protocol, the network 100 may be coupled to one or more client devices 102a, 102b, 102c. The client devices 102a, 102b, 102c (collectively referred to as "client devices 102") may include a personal computer, laptop, or other device that is configured for communicating with the network 100. While the client devices 102a, 102b may be wireline devices, the client device 102c may be configured for wireless communications and be configured to communicate with the network 100 via an access point 110 and/or other wireless communications device. In operation, the client devices 102 may be operated by an end user and/or an ICIE™ administrator, as discussed in more detail below. The access point 110 may be configured as a wireless cellular tower, a wireless fidelity (Wi-Fi) hotspot, a worldwide interoperability for microwave access (WIMAX) tower, and/or other wireless node.

Also included in the nonlimiting example of FIG. 1 are a monitoring server 106a and an authority server 106b. The servers 106a and 106b may be configured to receive data from at least one of the client devices 102 associated with potentially suspicious and/or illegal activities. Additionally, the servers 106a and 106b may be configured to facilitate the communication of electronic messages, which may include email, instant messages, short message service (SMS) messages, audio messages, video messages, and/or other electronic messages. In at least one exemplary embodiment, the monitoring server 106a may be configured as an In Case of Internet Emergency (ICIE™) server, which may be accessed by an ICIE™ administrator. Similarly, the authority server 106b may be configured as a police database server, an FBI server, a suicide center server, and/or other server that may be configured to provide desired information.

One should note that, while the diagram of FIG. 1 illustrates the servers 106a and 106b as single components, this is a nonlimiting example. More specifically, depending on the particular configuration, the servers 106a and 106b may be combined into a single computing device and/or include a plurality of servers, data storage components, and/or other components. Additionally, while the discussion regarding FIG. 1 describes embodiments where messages are sent via the servers 106a and 106b, this is also a nonlimiting example. In some embodiments, the servers 106 may facilitate a communication pathway between the message sender and message recipient, and may be configured to receive only a copy of the messages sent.

Figure 2:
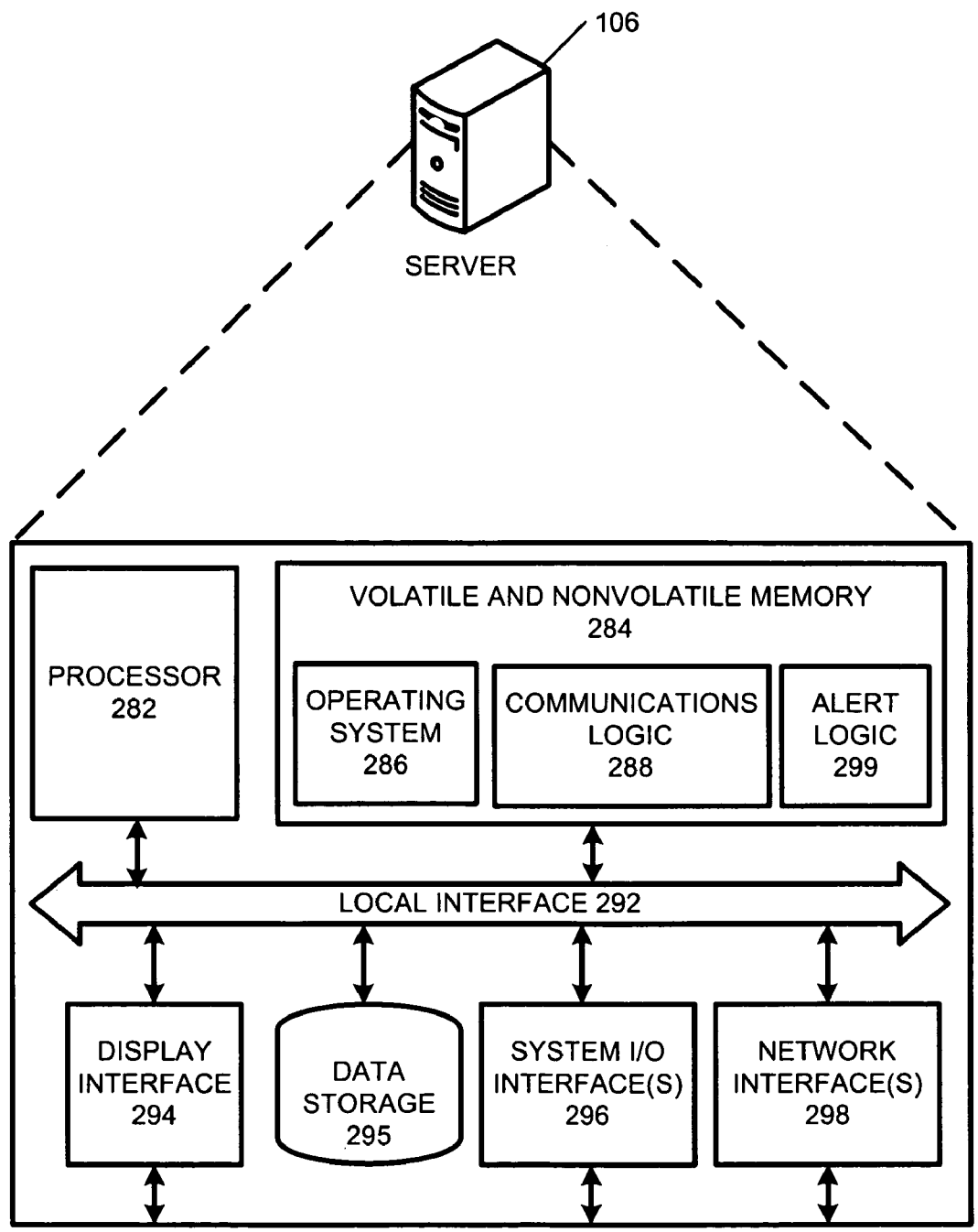
FIG. 2 illustrates an exemplary embodiment of a server that may be configured to provide options for uploading and/or downloading content, such as in the network from FIG. 1.

FIG. 2 illustrates an exemplary embodiment of a server 106, which may be configured to provide options for uploading and/or downloading content, such as in the network from FIG. 1. Although a wire-line device (e.g., the server 106) is illustrated, this discussion can be applied to wireless devices as well. According to exemplary embodiments, in terms of hardware architecture, the server 106 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not be limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may include a device for executing software, particularly software stored in the memory component 284. The processor 282 can include any custom made or commercially available processor, a central processing unit (CPU), an auxiliary processor among several processors associated with the server 106, a semiconductor based microprocessor (in the form of a microchip or chip set), a microprocessor, and/or generally any device for executing software instructions.

The memory component 284 can include any one or combination of volatile memory elements (e.g., random access memory (RAM, such as DRAM, SRAM, SDRAM, etc.))

and/or nonvolatile memory elements (e.g., ROM, hard drive, tape, CDROM, etc.). Moreover, the memory component 284 may incorporate electronic, magnetic, optical, and/or other types of storage media. One should note that the memory component 284 can have a distributed architecture (where various components are situated remote from one another), but can be accessed by the processor 282.

The software in the memory component 284 may include one or more separate programs, which may include an ordered listing of executable instructions for implementing logical functions. In the example of FIG. 2, the software in the memory component 284 may include the alert logic 299, as well as an operating system 286. The operating system 286 may be configured to control the execution of other computer programs and provides scheduling, input-output control, file and data management, memory management, and communication control and related services. The alert logic 299 may be configured to facilitate communication of alert data and/or one or more messages (emails, instant messages, SMS messages, faxes, and/or other messages) and/or provide an ICIE™ application.

A system component and/or module embodied as software may also be construed as a source program, executable program (object code), script, and/or any other entity comprising a set of instructions to be performed. When constructed as a source program, the program is translated via a compiler, assembler, interpreter, or the like, which may or may not be included within the memory component 284, so as to operate properly in connection with the operating system 286.

The input/output devices that may be coupled to the system I/O Interface(s) 296 may include input devices, for example, but not limited to, a keyboard, mouse, scanner, touch screen, microphone, etc. Further, the input/output devices may also include output devices, for example but not limited to, a printer, display, speaker, etc. Finally, the input/output devices may further include devices that communicate both as inputs and outputs, for instance, but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the server 106 can include the network interface 298 that includes a personal computer memory card international association (PCMCIA) card (also abbreviated as "PC card") for receiving a wireless network card, this is a nonlimiting example. Other configurations can include the communications hardware within the server 106, such that a wireless network card is unnecessary for communicating wirelessly. Similarly, other embodiments include the network interfaces 298 for communicating via a wired connection. Such interfaces may be configured with universal serial bus (USB) interfaces, serial ports, and/or other interfaces.

If the server 106 includes a personal computer, workstation, or the like, the software in the memory component 284 may further include a basic input-output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the server 106 is activated.

When the server 106 is in operation, the processor 282 may be configured to execute software stored within the memory component 284, to communicate data to and from the memory component 284, and to generally control operations of the server 106 pursuant to the software. Software in the memory component 284, in whole or in part, may be read by the processor 282, perhaps buffered within the processor 282, and then executed.

One should note that while the description with respect to FIG. 2 includes the server 106 as a single component, this is a nonlimiting example. More specifically, in at least one embodiment, the server 106 can include a plurality of servers, personal computers, telephones, and/or other devices. Similarly, while the description of FIG. 2 describes the server 106 as a server device, this is also a nonlimiting example. More specifically, depending on the particular exemplary embodiment, this description may apply to the client devices 102 and/or the access point 110, which may include similar elements, logic, and/or may be configured to provide one or more of the operations discussed herein.

Figure 3:
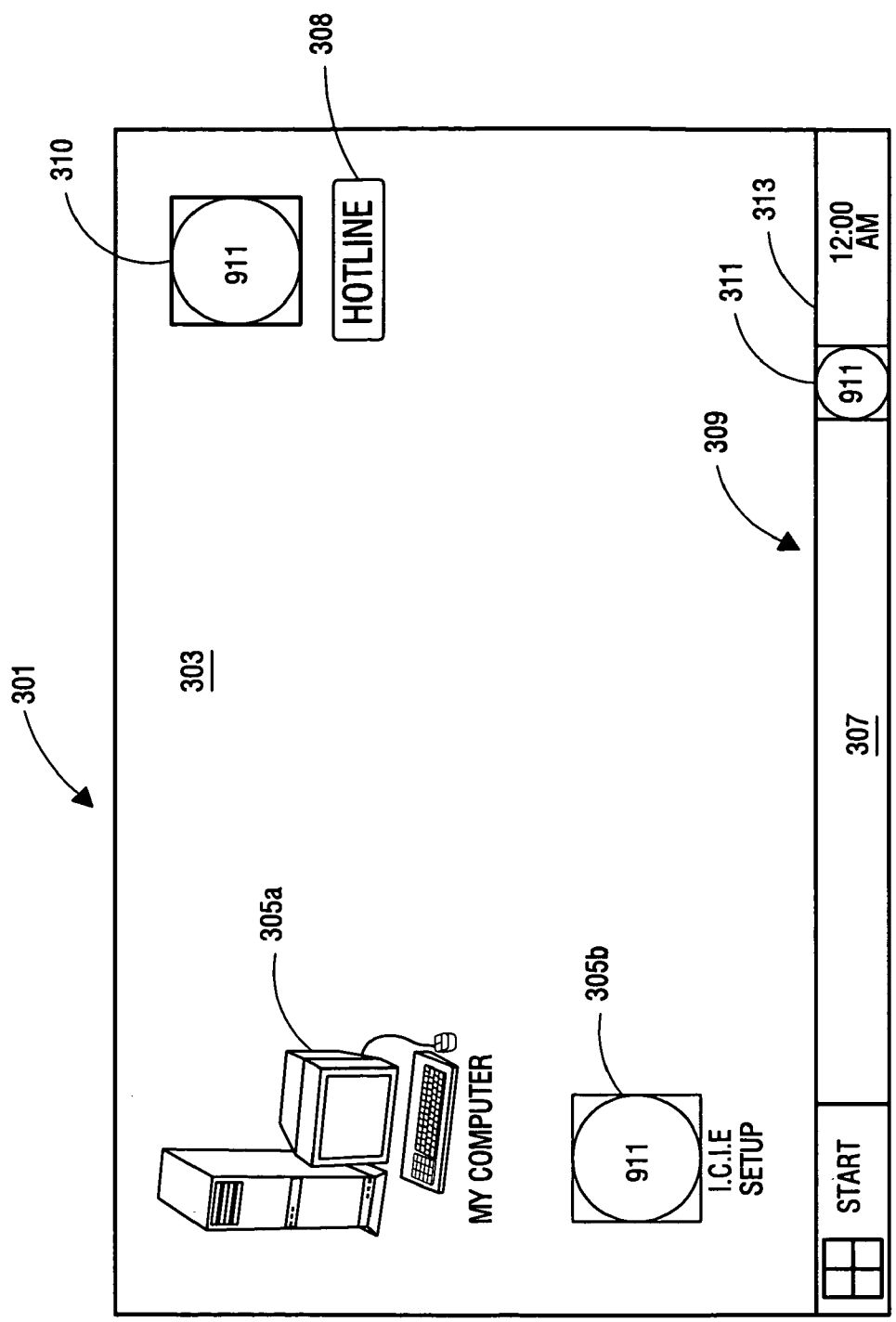
FIG. 3 illustrates an exemplary embodiment of a display for providing a data from the alert logic of FIG. 2.

FIG. 3 illustrates an exemplary embodiment of a display that may be provided by the alert logic 299 from FIG. 2. In particular, FIG. 3 illustrates a computer display 301 for providing an exemplary embodiment of the ICIE™ application functionality. As illustrated in this nonlimiting example, the computer display 301 may include a desktop area 303 for providing one or more desktop icons 305*a*, 305*b*. The desktop icon 305*a* may be configured to provide access to local and/or remote storage drives. The desktop icon 305*b* may be configured to provide a setup interface for configuring the ICIE™ application. In at least one exemplary embodiment, upon installation and/or setup of the ICIE™ application, a reporting option 310 may be placed on the computer display 301 to indicate that the alert logic is installed on the client device 102 and/or server 106, as well as provide a reporting option for the client device 102, as discussed in more detail below. As also described in more detail below, a hotline option 308 may be provided on the computer display 301, on a web browser, email application, instant messaging application, and/or elsewhere.

Additionally, in at least one exemplary embodiment, the computer display 301 may further include a task bar 307, which may illustrate one or more applications running in the foreground of the client device 102 and/or server 106. Moreover, the task bar 307 may include a system tray 309 that contains a system clock 313 and one or more system tray options 311, indicating applications running that are currently in the background. In at least one exemplary embodiment, a system tray option 311 may be configured to represent the ICIE™ application running on the client device for and/or server 106.

Figure 4:
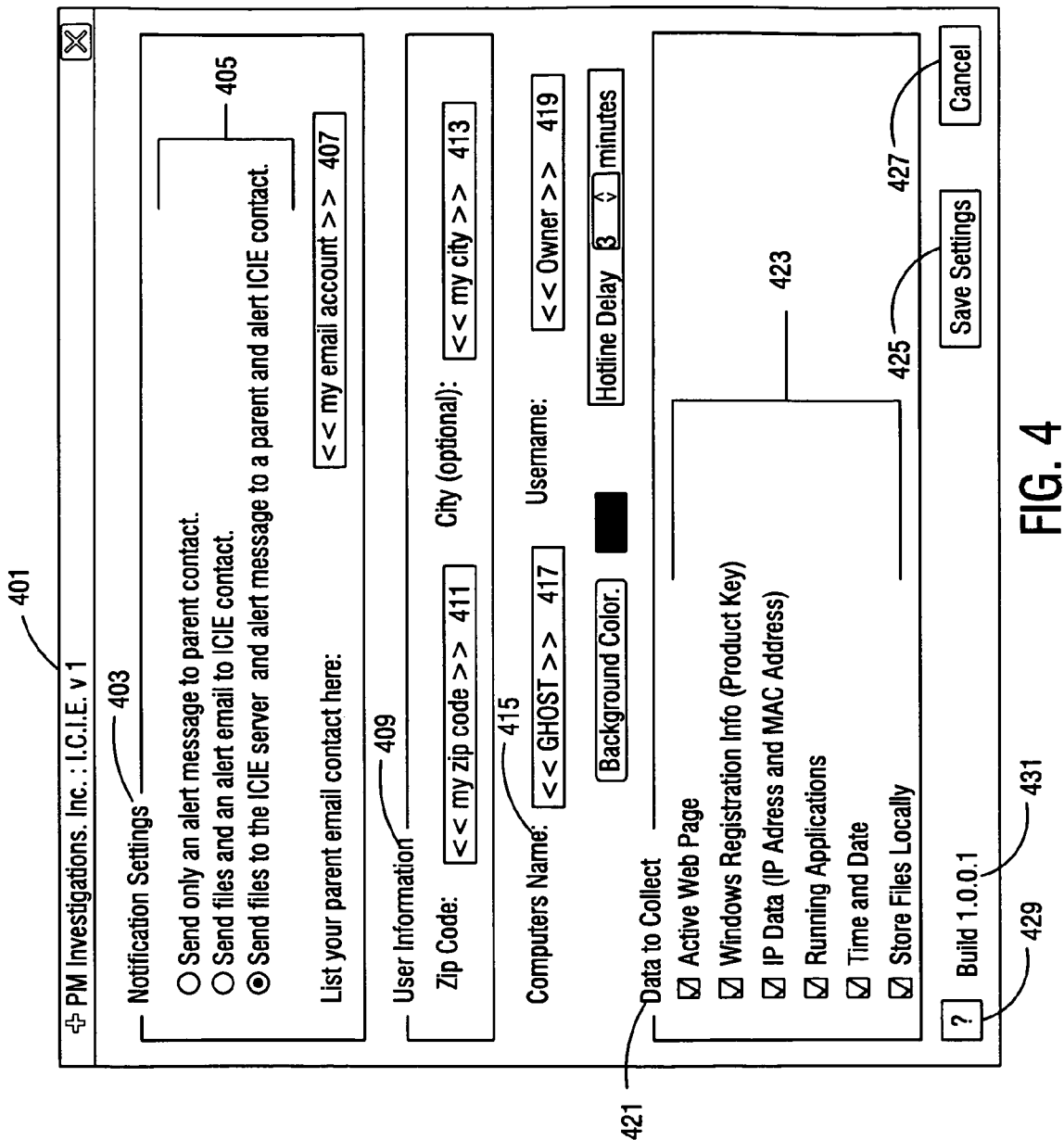
FIG. 4 illustrates an exemplary embodiment of a user interface that may be provided for establishing preferences for the alert logic from FIG. 2.

FIG. 4 illustrates an exemplary embodiment of a user interface 401 that may be provided when a user selects the 911 desktop icon 305*b* and/or the system tray option 311 from FIG. 3. In this nonlimiting example, the user interface 401 may contain a notification settings section 403 where a user may provide one or more notification preferences. In at least one exemplary embodiment, the user may indicate preferences for sending alerts of questionable Internet activity and/or Internet files of the questionable Internet activity to a user-identified contact and/or the ICIE™ administrator. The notification settings section 403 may include a sender list 405 having one or more combinations for the user preferences.

As a nonlimiting example, the sender list 405 may include options for: sending only an alert message to only the user-identified contact(s); sending an alert message to the ICIE™ administrator and/or sending information about a questionable website to an ICIE™ server (e.g., monitoring server 106*a*); and/or sending an alert message to the user-identified contact(s) and/or the ICIE™ administrator, as well as information about the questionable website to the server 106. In at least one nonlimiting example, the ICIE™ contact may be an administrator who examines the information sent by the user.

Further, the notification settings section 403 may also include a user-identified contact box 407 for receiving user provided contact information. While the user-identified contact box 407 may be illustrated as being configured to receive an email address, some embodiments may be configured to receive one or more phone numbers, fax numbers, e-mail addresses and/or physical addresses. As illustrated, the email address (and/or other contact information) received in the user-identified contact box 407 may be associated with contact information for a parent, a legal guardian, a school administrator, and/or an employer, as non-limiting examples.

Similarly, some embodiments of the user interface 401 may include a user information section 409 where a user may provide location information of the client device 102 and/or user to whom the ICIE™ application will be provided. In at least one embodiment, the user information section 409 may include a zip code field 411 where the user may indicate a zip code where the user and/or client device 102 is located. Further, the user information section 409 may also include a city field 413 where the user may indicate a city of the client device 102. In the user information section 409, the user may also indicate a state name for the client device 102, a country name for the client device 102, a phone number, and/or other information. As discussed in more detail below, by indicating a location in section 409, the alert logic 299 may determine a desired authority contact (e.g., a particular police station, fire station, suicide help center, etc.) for reporting the suspicious activity.

Additionally, the user interface 401 may contain a computer information section 415 where the user may provide data regarding the client device 102 that the user is operating. The computer information section 415 may include a computer name field 417 and a username field 419, where the user may indicate the username for logging into the ICIE™ application. Additionally, the computer information section 415 may be configured to provide one or more configuration options that may allow thresholds, background color selections, hotline delays, and/or other settings to be configured on a system and/or per-user basis.

In at least one exemplary embodiment, the user interface 401 may contain a data collection section 421 for providing options to indicate preferences for types of data to collect. The data collection section 421 may include a list of one or more options for 423 data collection. In at least one exemplary embodiment, the list of options 423 may include options to collect data associated with an active web page, Windows registration information, Internet protocol (IP) data, media access control (MAC) data, running applications, time, and/or date. Further, the list of options 425 may include an option for the user to store the selected data locally on the user's computer and/or other options.

Additionally, in at least one exemplary embodiment, the user interface 401 may include a save option 423 to save user preferences, and/or a cancel option 427 to cancel any changes made to user preferences. Further, the user interface 401 may also include an about button 429 that displays information about the ICIE™ logic when selected and a build information 431 that displays a software build version for the present disclosure.

Figure 5:
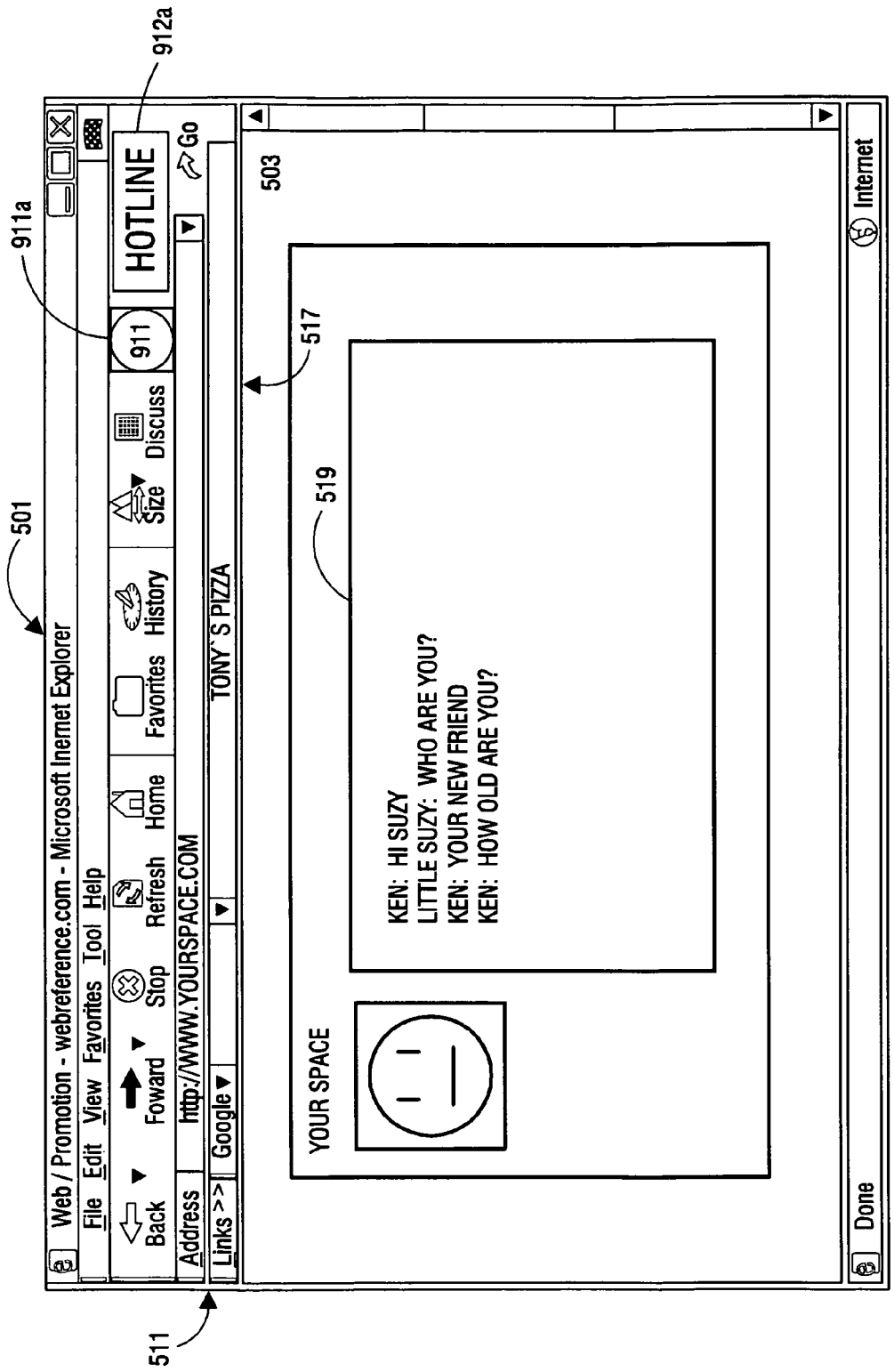
FIG. 5 illustrates an exemplary embodiment of an Internet browser having the alert logic from FIG. 2.

FIG. 5 illustrates an exemplary embodiment of an Internet browser 501 displaying web content 503, such as may be provided by the client device 102, from FIG. 1. As illustrated in FIG. 5, the Internet browser 501 may include a reporting option 911a that facilitates operation of the ICIE™ application upon selection, as well as a hotline option 912a. Also included is a toolbars section 511 that may be configured to provide one or more advertisements via an advertisement tool 517 that may display an advertisement. As a nonlimiting example, in at least one embodiment, the ICIE™ application may be configured to provide advertisements based on user information (and/or other information). As a nonlimiting example, the ICIE™ application may be configured to determine location data, Internet browsing data, age data, client device data, and/or other data to personalize and/or target the advertisements provided to the user.

Additionally, depending on the particular configuration, the advertisement tool 517 may be configured for expansion, such that upon selection of the advertisement tool 517, a popup window may be provided that provides one or more advertisements according to different levels of targeting. As a nonlimiting example, a first level may determine that the user is located in the United States. Accordingly, the first advertisement level may be directed to United States residents. A second level may determine that the user is a Georgia resident. Accordingly, in the second level, advertisements directed to Georgia residents may be provided. Additionally, other levels may further narrow the user's location and/or preferences to provide directed advertisements.

In operation, a user may browse the Internet via the Internet browser 501. The browsing may include navigating websites such as MySpace™, Facebook™, Linkedin™, Plaxo™, and/or other social Internet activities (e.g., instant messaging, email, chat rooms, etc.). While browsing, the user may encounter suspicious and/or dangerous activity. The suspicious and/or dangerous activity may include any activity that the user determines is potentially related to illegal, harmful, and/or disrespectful actions. Upon determining that such dangerous and/or suspicious activity has occurred, the user may select the reporting option 911a and/or hotline option 912a. In response to selection of the reporting option 911a, the ICIE™ application may collect the web content 503 to analyze the suspicious content 519.

As discussed in more detail below, the ICIE™ application may be configured to capture data and/or metadata regarding the webpage accessed. Additionally, as in the nonlimiting example of FIG. 5, the ICIE™ application may collect an Internet protocol (IP) address of "Ken," as well as other information.

Additionally, the user may also be provided the hotline option 912a. In response to selection of the hotline option 912a, one or more predetermined special contacts may be notified of the suspicious activity, as discussed in more detail, below.

Figure 6:
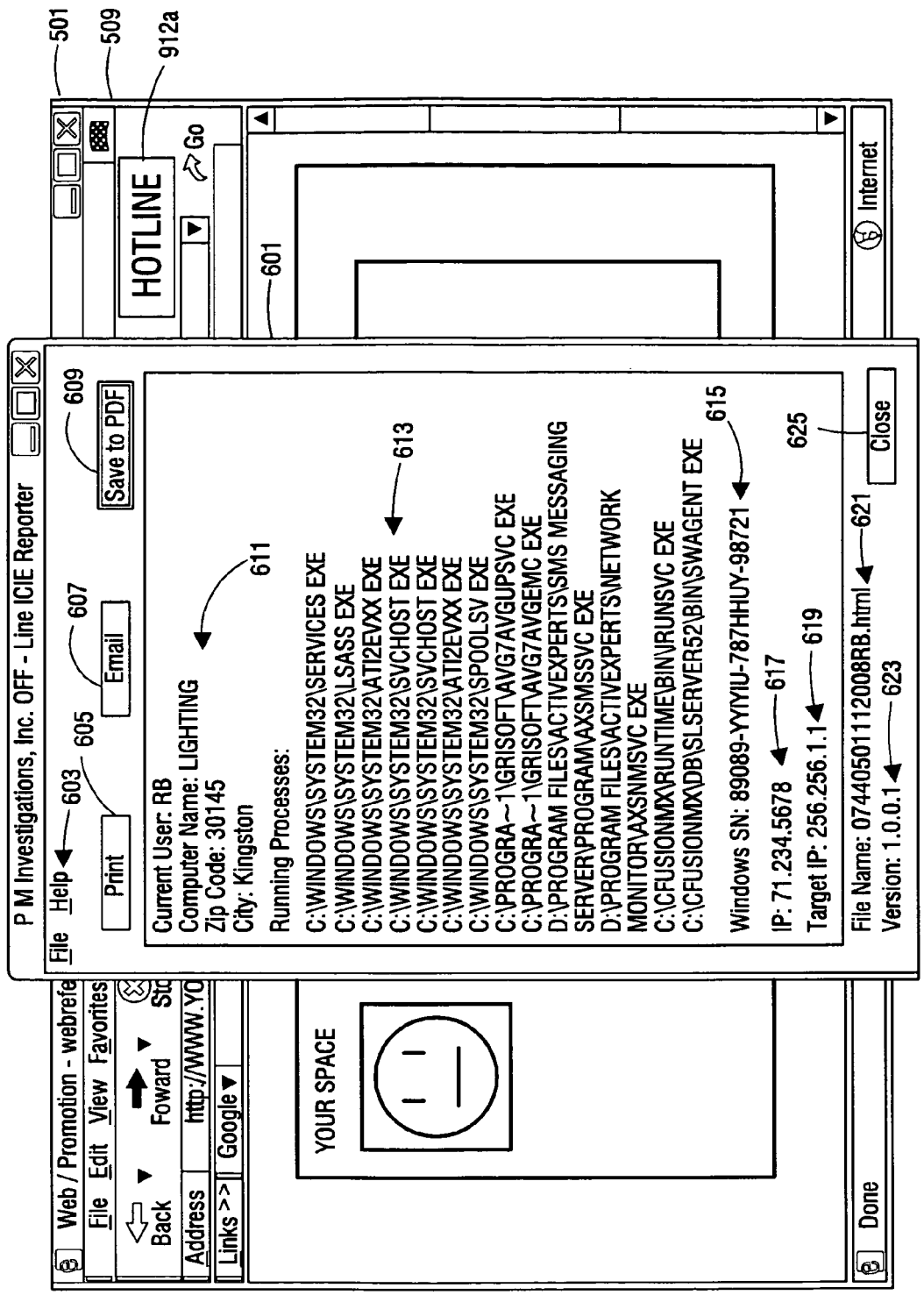
FIG. 6 illustrates an exemplary embodiment of a report for an Internet browser displaying suspicious web content, such as may be provided by the alert logic from FIG. 2.

FIG. 6 illustrates an exemplary embodiment of an ICIE™ report 601 that may be generated when the user selects the reporting option 911a on the Internet browser 501 (FIG. 5). In at least one exemplary embodiment, the ICIE™ report 601 may include a menu row 603 having one or more menus that the user may operate. Further, the ICIE™ report 601 may include a print option 605 that may facilitate printing of an ICIE™ report. Additionally, at least one embodiment may include an email option 607 for emailing the ICIE™ report 601 when selected. More specifically, the ICIE™ report may be emailed (and/or otherwise sent) to a desired entity based on the zip code, city, state, and/or other options indicated in FIG. 4. Similarly, a save to PDF option 609 may be provided for saving the ICIE™ report (locally and/or remotely) in a PDF format when selected.

In at least one exemplary embodiment, the contents of the ICIE™ report 601 may include a user information block 611 where the username, the computer name, the zip code, the city, the state, the country and/or the phone number may be identified. Similarly, the ICIE™ report 601 may include a running processes block 613 that may indicate names and locations of processes running on the user's client device 102 at the time user selects the reporting option 911a. The ICIE™ report 601 may also include a serial number block 615 for providing a system serial number of the user's client device 102. Further, the ICIE™ report 601 may include an IP address section 617 that may provide the IP address for the user's client device 102 at the time the user clicked the reporting option 911a (FIG. 5). ICIE™ report 601 may also include a target IP address section 619 representing an IP address associated with a client device 102 that may have originated suspicious content.

Further, the ICIE™ report 601 may also provide a report name field 621 for the ICIE™ report 601. The ICIE™ report 601 may also include a software version section 623 that indicates a version of the ICIE™ application that generated the ICIE™ report 601. Also, the ICIE™ report 601 may include a close button 625 that may close the ICIE™ report 601 when selected.

Figure 7:
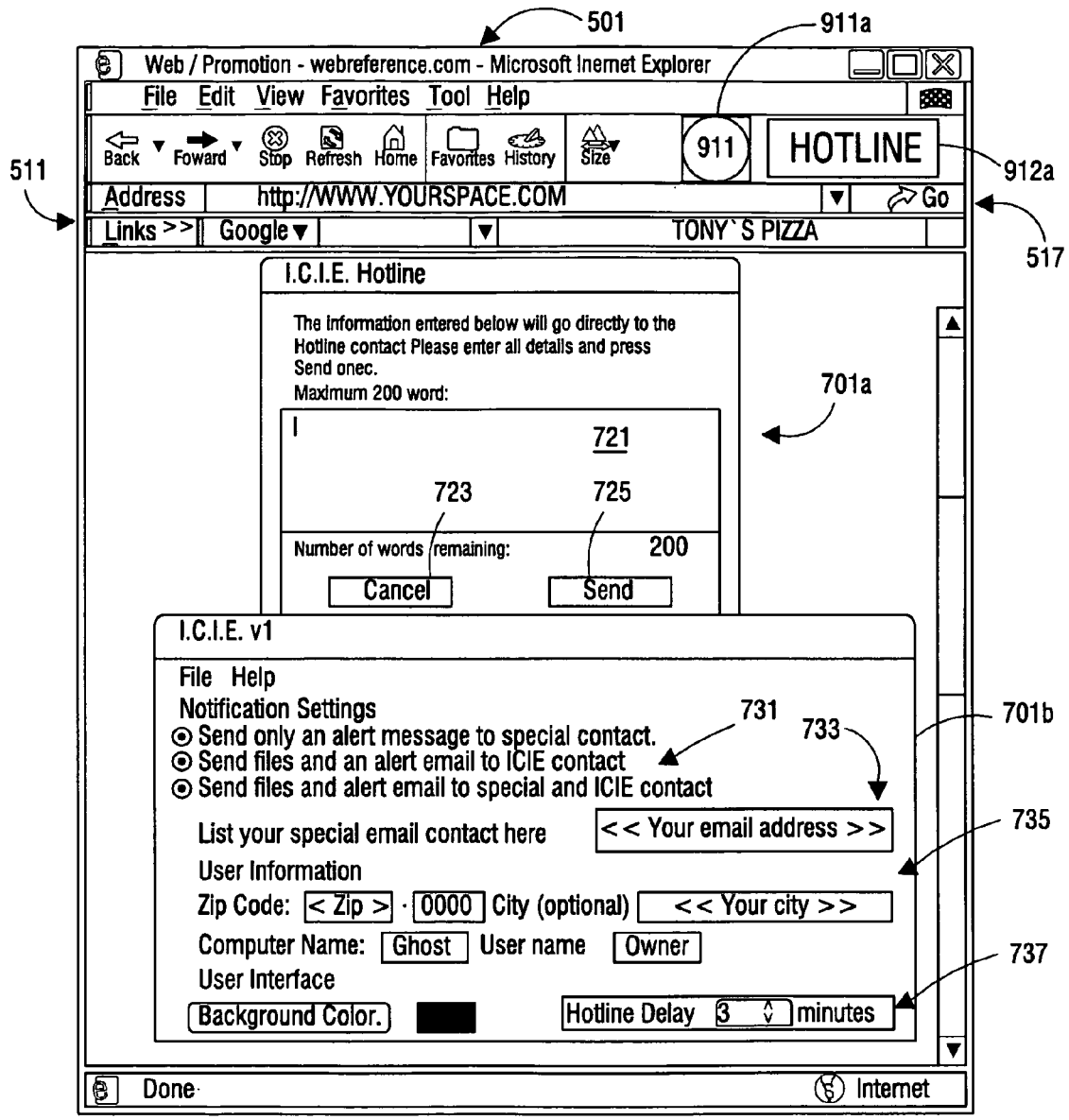
FIG. 7 illustrates an exemplary embodiment of options that may be provided in response to selection of the hotline option, as illustrated in FIG. 5.

FIG. 7 illustrates an exemplary embodiment of options that may be provided in response to selection of the hotline option 912, as illustrated in FIG. 5. As illustrated in the nonlimiting example of FIG. 7, the Internet browser 501 may be configured to launch a text window 701a. The text window 701a may include a text portion 721 for receiving one or more characters for sending to a special contact (and/or ICIE contact). By selecting a send option 725, data from the text window 701a may be sent to the special contact, as identified in a control panel 701b (also accessible via the Internet browser 501). The control panel 701b may include notification settings portion 731, a special contact address portion 733, a user information portion 735, and a delay option 737.

In operation, in the control panel 701b, the user can determine desired actions to be taken in response to selection of the hotline option 912. More specifically, an exemplary embodiment of options may include: only an alert may be sent to the special contact; files and an alert may be sent to the special contact; and files and an alert may be sent to the special contact and an ICIE contact. Similarly, an address (e.g., email address, IM address, telephone number, etc.) may be provided in the special contact address portion 733. Additionally, the user information may include a zip code (and/or other location identifier), computer name, user name etc. The delay option 737 may be set to a desired delay to prevent users from continually pressing the send option 725.

Figure 8:
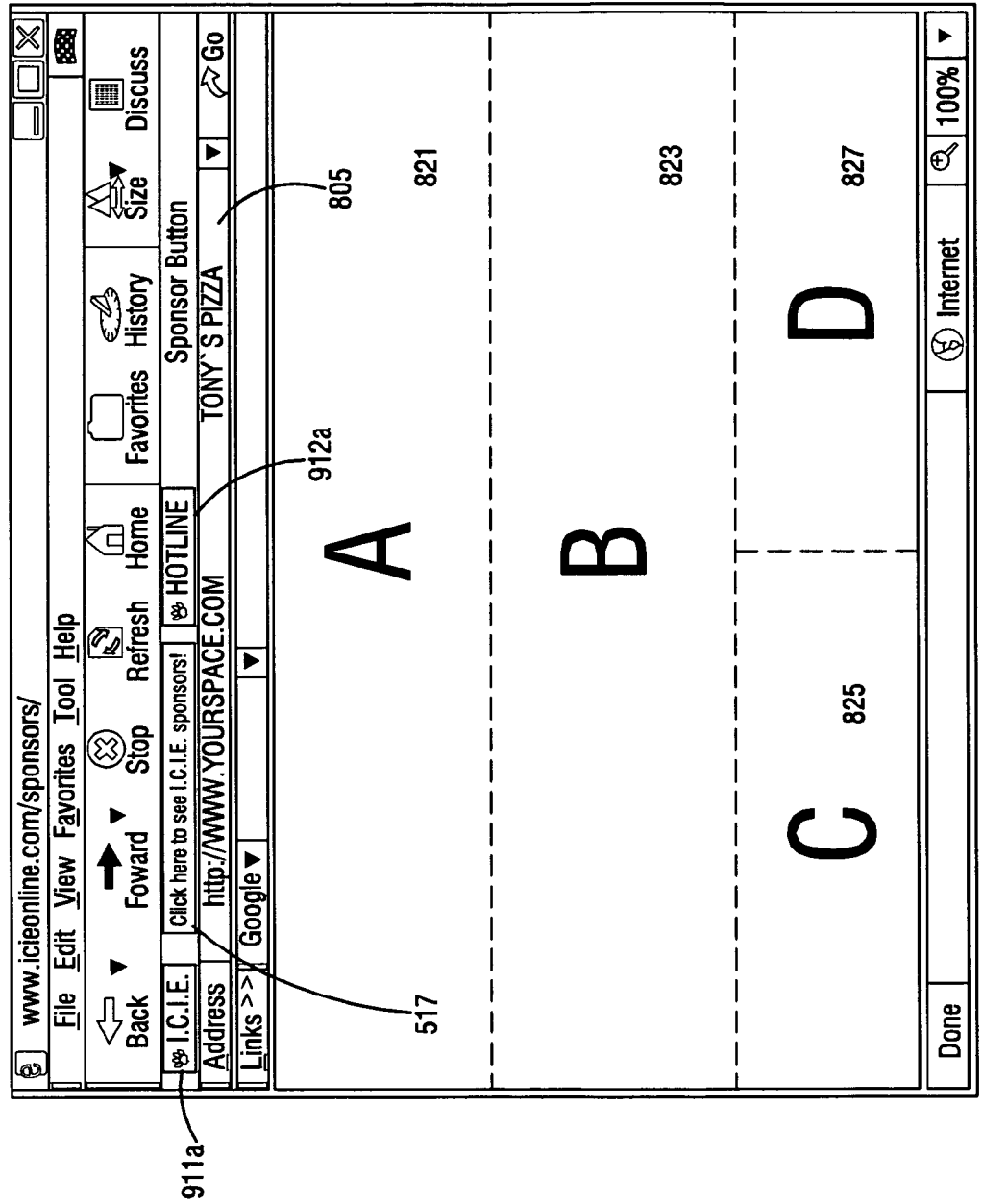
FIG. 8 illustrates an exemplary embodiment of an advertisement interface, such as may be provided in response to selection of the advertisement tool, from FIG. 5.

FIG. 8 illustrates an exemplary embodiment of an advertisement interface, such as may be provided in response to selection of the advertisement tool 517, from FIG. 5. As illustrated in the nonlimiting example of FIG. 8, in response to selection of the advertisement tool 571, a hierarchical display of advertisements may be provided. More specifically, the user's zip code may be determined such that custom images may be provided within one or more of the advertiser areas 821, 823, 825, 827. Each area may be configured to provide image data, flash data, really simple syndication (RSS) data, text, video, and/or other data.

In at least one exemplary embodiment the advertiser area 821 may be configured as a global area. More specifically, all listed global images can be loaded within this section. These images may rotate through a list of approved nationally known companies that have signed up through a registration process. This gives the user a refreshed look at more than a plurality of advertisements during the time of a live connection. There is no limit to the number of advertisements, but the combined size of the advertisements generally fit within the advertiser area 821.

Similarly, advertiser area 823 may be directed to local sponsors and/or advertisers found of the user (indicated by the user's zip code). The combination of the first 5 digits of the user's zip code combined with the first two digits of the suffix (digits 6 and 7 of the zip code) may be utilized to determine longitude and latitude relative to the user and actual county of user. If the user enters a non-available four digit set of numbers, advertisements may be randomly provided from the global section. However, once the location has been determined, the ICIE. database releases a series of images and messages directly related to the customer's location such as a local school or town event.

Additionally, the advertiser area 825 may be configured to provide a physical location within the area of the customer. The 8th digit of the user's zip code may be determined and a hard coded advertisement may be provided. The advertiser area 825 may be configured with similar and/or the same capabilities as advertiser areas 821, 823, but may be limited to the size as shown in illustration above. As a nonlimiting example, advertiser area 825 may be configured to generate an advertisement regarding art class of a local school to which the user is proximate.

Further, the advertiser area 827 may be configured to provide a physical location within the area of the customer. A 9th digit of the user's zip code may be determined and a hard coded advertisement may be provided. The advertiser area 827 may be configured to offer similar and/or the same capabilities as to advertiser areas 821, 823, and 825, and may be limited to the size.

Figure 9:
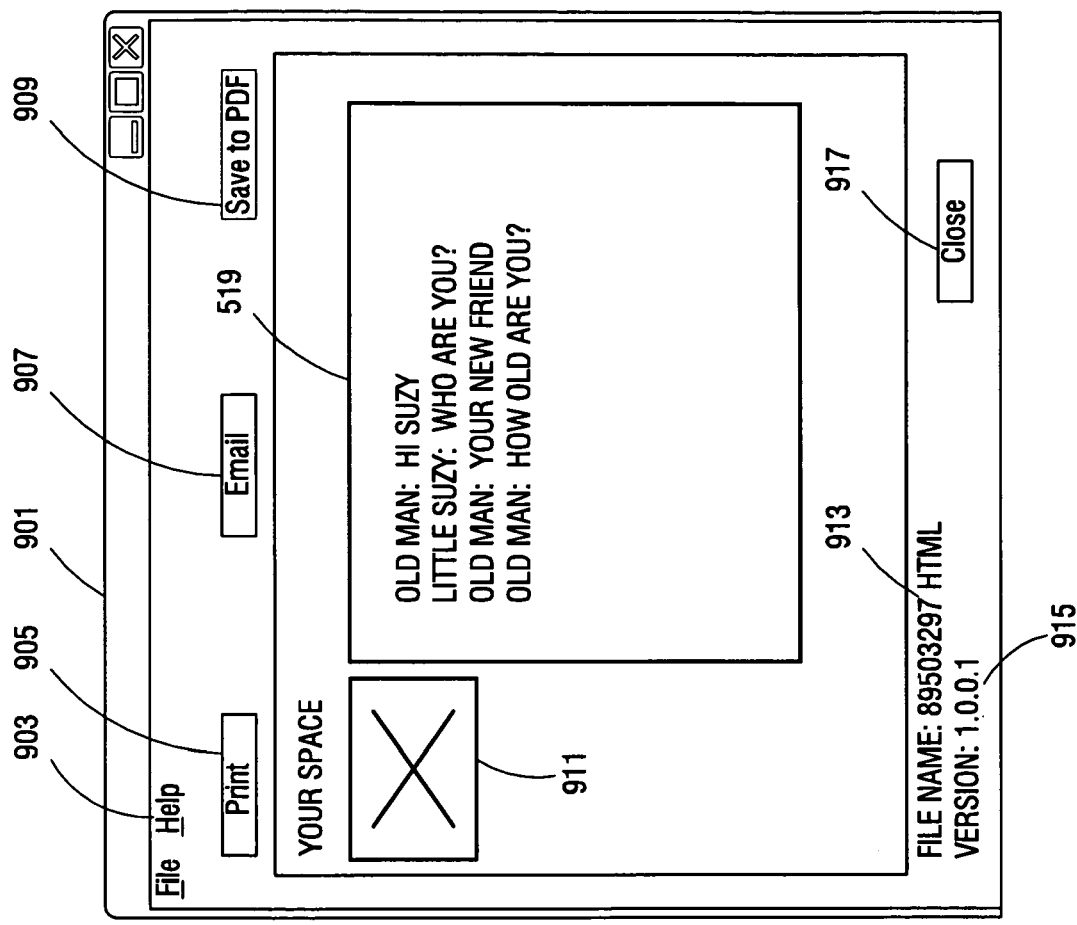
FIG. 9 illustrates an exemplary embodiment of an off-line version of the questionable web content reported to an administrator, similar to the diagram from FIG. 5.

FIG. 9 illustrates an exemplary embodiment of an off-line viewer 901 depicting information that may be sent to the ICIE™ administrator when the user reports suspicious content via selection of the reporting option 911a (FIG. 5). In at least one exemplary embodiment, the off-line viewer 901 may include a menu row 903 having one or more menus that the user may select. Further, the off-line viewer 901 may include a print button 905 for facilitating printing of the transcript data, and/or other data (at least a portion of which is sent to the ICIE™ administrator). Similarly, an email option 907 is also included to facilitate re-entering on-line mode and emailing the data to the ICIE™ administrator and/or a save to PDF button 909 for saving the data sent to the ICIE™ administrator in a PDF format when selected.

As a nonlimiting example, the off-line viewer 901 may be configured to display an off-line version of the web content 503 depicted in FIG. 5. In particular, the off-line viewer 901 may include at least a portion of the suspicious content 519, from FIG. 5. While images may be presented in the off-line viewer 901, in at least one exemplary embodiment, the off-line viewer 901 may not download the images found in the web content 503 and instead have an image box 911 indicating the location of an image.

The off-line viewer 901 may also include a report name field 913 that can indicate the file name for the off-line viewer 901. The off-line viewer 901 may further have a software version section 915 that indicates a version number of the ICIE™ application that generated the contents for off-line viewer 901. Also, the off-line viewer 901 may have a close option 919 for closing the off-line viewer 901.

Figure 10:
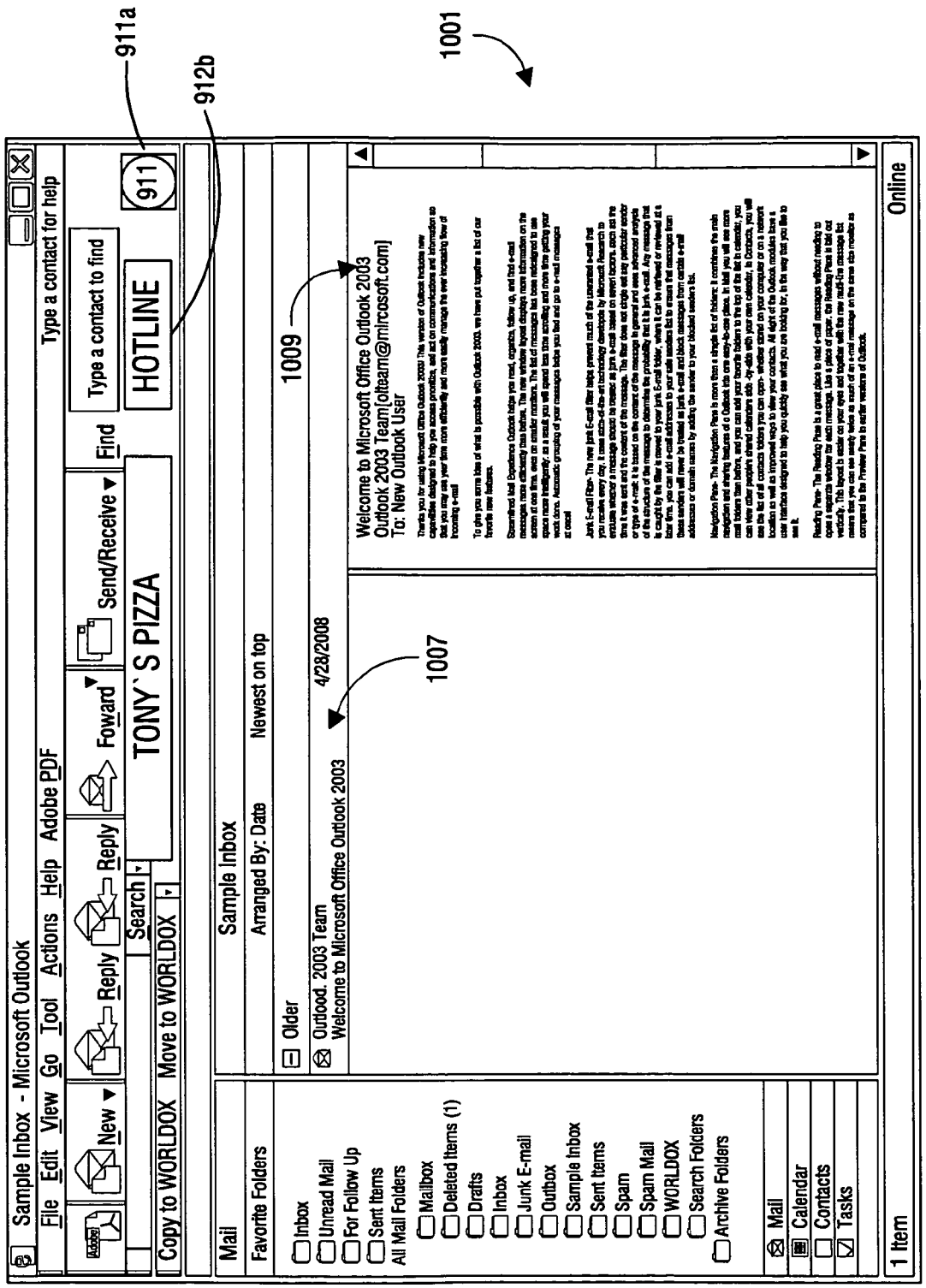
FIG. 10 illustrates an exemplary embodiment of an email application configured to implement the alert logic from FIG. 2.

FIG. 10 illustrates an exemplary embodiment of an email interface 1001 configured with the ICIE™ application to monitor web activity. As illustrated, the email interface 1001 includes an email reporting option 911b to execute the ICIE™ application, as well as a hotline option 912b, similar to embodiments discussed above. The email interface 1001 may also include an advertisement block 1005 to display an advertisement, which may be provided by the ICIE™ application. As a nonlimiting example, the email interface 1001 may be configured to send and receive email 1007 that includes email content 1009. In at least one exemplary embodiment, upon selection of the email reporting option 911*b*, the ICIE™ application may analyze the email content 1009 for content indicative of suspicious and/or dangerous activity. Similarly, some embodiments may be configured to automatically analyze email content 1009, without selection of the reporting option 911*b*.

Figure 11:
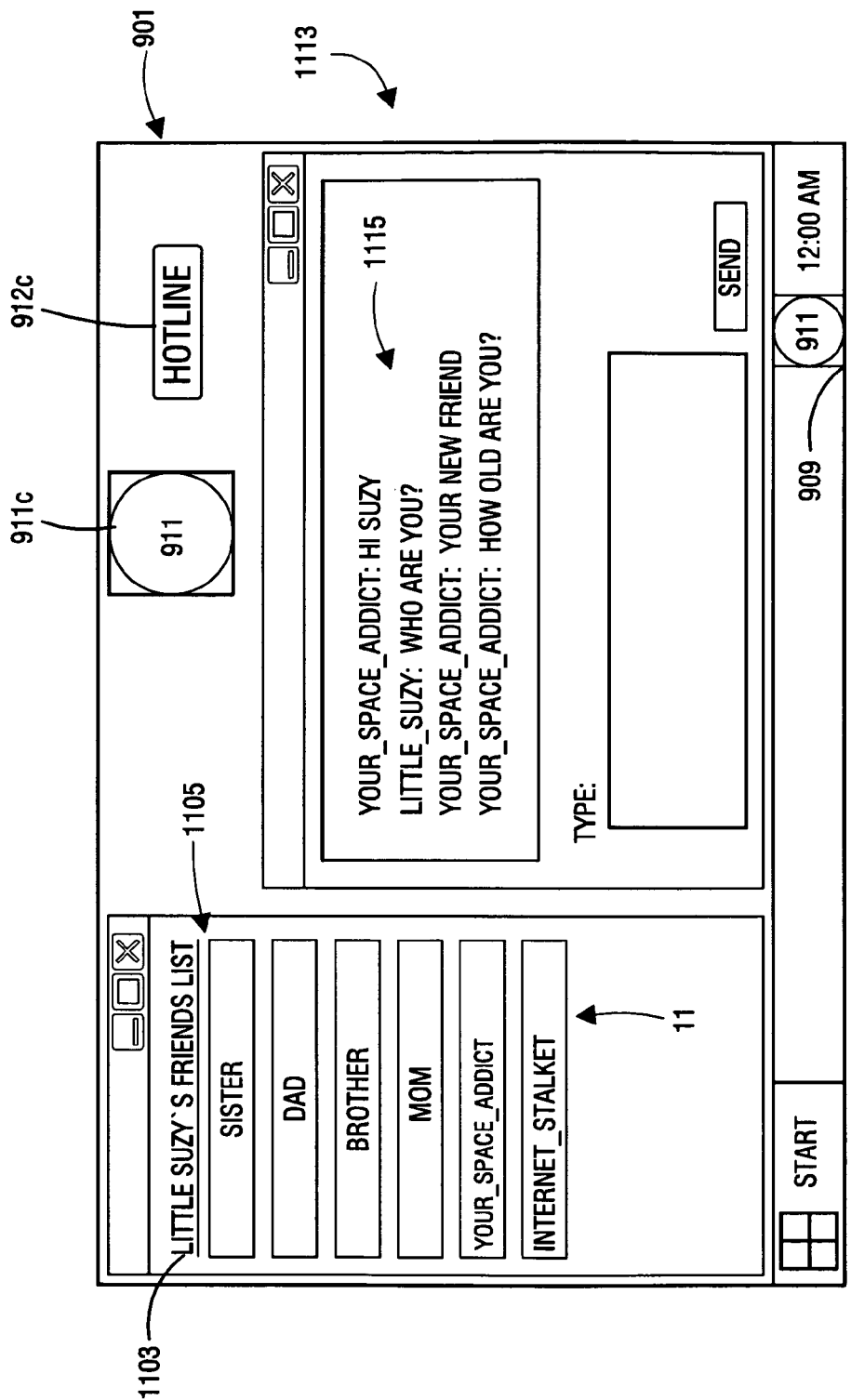
FIG. 11 illustrates an exemplary embodiment of an interface for monitoring Internet activity on an instant messaging application, such as may be provided by the alert logic from FIG. 2.

FIG. 11 illustrates an exemplary embodiment of an interface 1101 provided by the ICIE™ application for monitoring instant messaging communications. In particular, FIG. 11 illustrates an instant messaging interface 1101 that may facilitate communications over the Internet. As illustrated, the user may be associated with a screen name 1103, (e.g., LITTLE_SUZY) and a friends list 1105. Further, the friends list 1105 may include a plurality of screen names associated with the user's contacts (e.g., SISTER 1105*a*, DAD 1105*b*, BROTHER 1105*c* and MOM 1105*d*). Additionally, while the exemplary embodiment of FIG. 11 illustrates a plurality of contacts, some embodiments may be configured such that other users (who may not be a contact of the user) may communicate with the user via the instant messaging interface 1101.

Additionally, as illustrated in the IM window 1113, the user may receive an instant message from another user associated with YOUR_SPACE_ADDICT 1105*e* and/or INTERNET_STALKER 1105*f*. In this exemplary embodiment, the IM communication of FIG. 11 contains suspicious content 1115. Upon viewing the suspicious content 1115, the user may select the IM reporting option 911*c* and/or a hotline option 912*c* to initiate reporting of the suspicious activity. Additionally, in some embodiments, the ICIE™ application may be running in the background and the instant message from another user may be automatically examined for questionable activity without being prompted by the user. Further, an IP address associated with YOUR_SPACE_ADDICT 1105*e* may be sent with the suspicious content 1115 depicted in FIG. 11. Accordingly, the ICIE™ application may be configured to save, capture, and/or transmit this IP address to the server 106.

Figure 12:
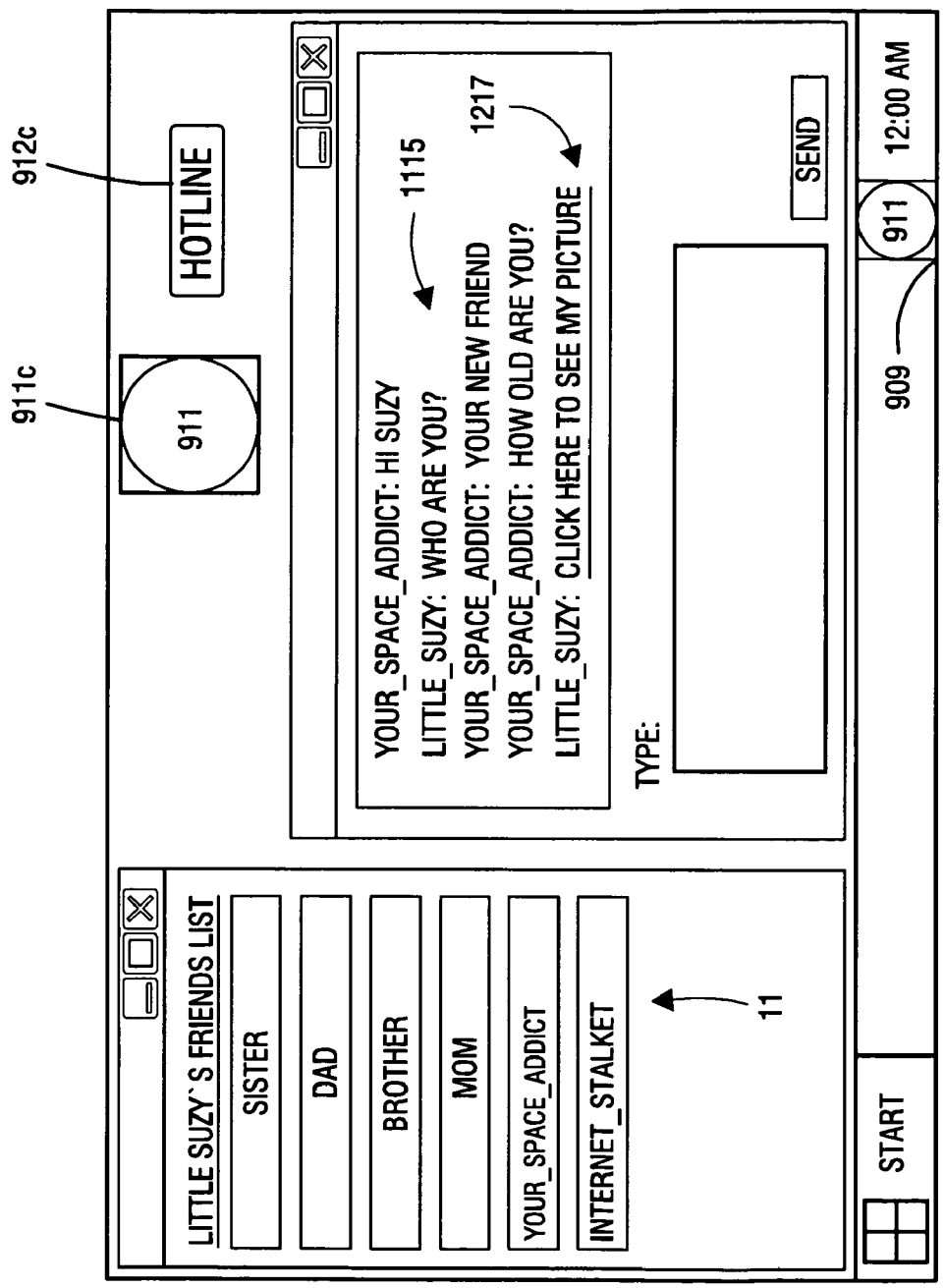
FIG. 12 illustrates an exemplary embodiment of a link that may be provided to an Internet user for capturing an Internet protocol (IP) address, similar to the diagram from FIG. 11.

FIG. 12 illustrates an exemplary embodiment of a link 1217 that may be provided to an Internet user for capturing an Internet protocol (IP) address, similar to the diagram from FIG. 10. More specifically, in some embodiments, depending on the type of instant messaging logic 288 being utilized, the IP address may not be accessible to the ICIE™ application directly (e.g., if YOUR_SPACE_ADDICT is accessing the internet via America Online™). In such scenarios, the ICIE™ application may be configured to generate and send the link 1217 to the potentially suspicious user in the instant message communication 1115. More specifically, as illustrated in FIG. 10, the ICIE™ in at least one exemplary embodiment, LITTLE_SUZY may be engaged in an IM communication with YOUR_SPACE_ADDICT 1005*e*. At one point in the communication, a determination may be made that YOUR_SPACE_ADDICT 1005*e* has sent a message that includes suspicious material. Accordingly, a determination can be made that the IP address associated with YOUR_SPACE_ADDICT's client device 102 is unavailable to the ICIE™ application.

Accordingly, the ICIE™ application may be configured to create a message from LITTLE_SUZY that includes the website link 1217. The ICIE™ application can then send the website link 1217 from LITTLE_SUZY to YOUR_SPACE_ADDICT 1005*e*. The website link 1217 may be masked as a link to a website that interests YOUR_SPACE_ADDICT 1005*e*. However, the website link 1217 may be configured to capture YOUR_SPACE_ADDICT's IP address. More specifically, when YOUR_SPACE_ADDICT 1005*e*, selects the website link 1217, the ICIE™ application captures the IP address of YOUR_SPACE_ADDICT's client device 102 and may then associate the captured IP address with the suspicious content 1015 received by the ICIE™ application. In the nonlimiting example of FIG. 11, the link sent from LITTLE_SUZY reads "CLICK HERE TO SEE MY PICTURE."

Figure 13:
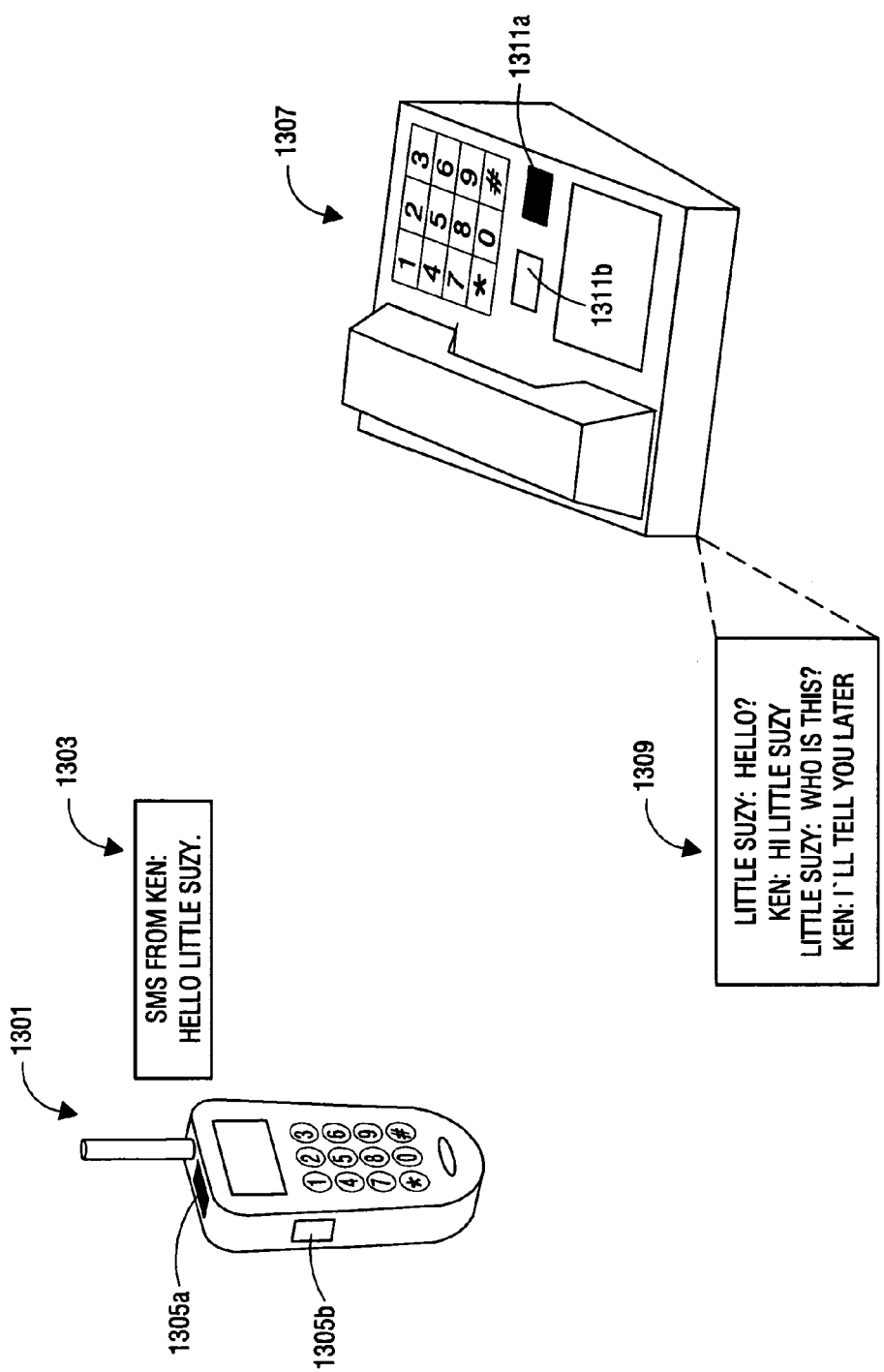
FIG. 13 illustrates exemplary embodiments of a plurality of communications devices, which may utilize the alert logic from FIG. 2.

FIG. 13 illustrates an exemplary embodiment of other scenarios for utilizing the alert logic 299. As a nonlimiting example, LITTLE_SUZY may receive a text message (e.g. short message system (SMS) message) on a cellular telephone 1301, containing suspicious content 1303. Upon encountering this suspicious interaction, LITTLE_SUZY may activate one or more options 1305*a*, 1305*b* (e.g., buttons) located on a cellular phone 1301 (and/or other mobile communications device). The option 1305*a* may be utilized as a reporting option, while the option 1305*b* may be utilized as a hotline option. In response to selection of one or more of the options 1305*a*, 1305*b*, at least a portion of the communication (e.g., the SMS message) may be examined. The ICIE™ application may capture data related to the communication and send the captured data to one or more predetermined recipients according to the selected settings from FIG. 5.

FIG. 13 also illustrates an embodiment where the ICIE™ application may be utilized with a public switched telephone network (PSTN) telephone 1307. As a nonlimiting example, LITTLE_SUZY may receive a telephone call that results in a suspicious conversation 1309. Upon encountering this suspicious interaction, the user may activate one or more options (e.g., a buttons) 1311*a* (utilized as a reporting option), 1311*b* (utilized as a hotline option) located on the telephone 1307 to execute the ICIE™ application. More specifically, in some embodiments, a recording can be started upon initiation of the suspicious conversation 1309. If LITTLE_SUZY activates the option 1313, the recording and/or other data can be compiled and sent to the predetermined recipients (e.g., according to the selections made in FIG. 5). Similarly, some embodiments may be configured to begin recording the suspicious conversation 1309 upon selection of the option 1311.

Figure 14:
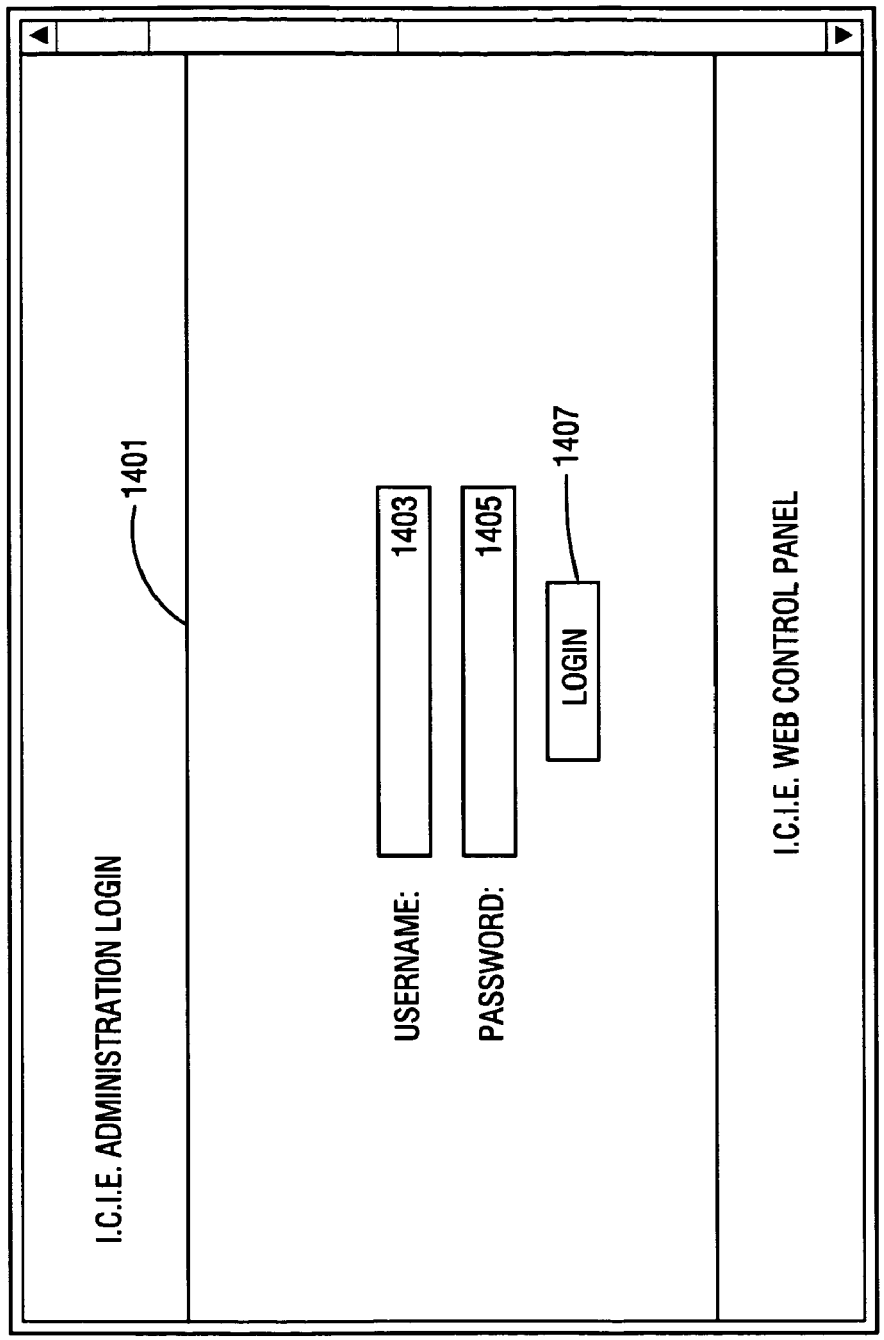
FIG. 14 illustrates an exemplary embodiment of a login page for an ICIE™ administrator such as may be provided by the alert logic from FIG. 2.

FIG. 14 illustrates an exemplary embodiment of an administrator login page 1401 to access a control panel for the ICIE™ application. In this nonlimiting example, the administrator login webpage 1401 provides a username field 1403 for the ICIE™ administrator to enter a username and a password field 1405 to enter a corresponding password. Further, upon selection of a login button 1407 and determination of the authenticity of the username and password, the ICIE application provides the ICIE™ administrator access to the control panel area.

Figure 15:
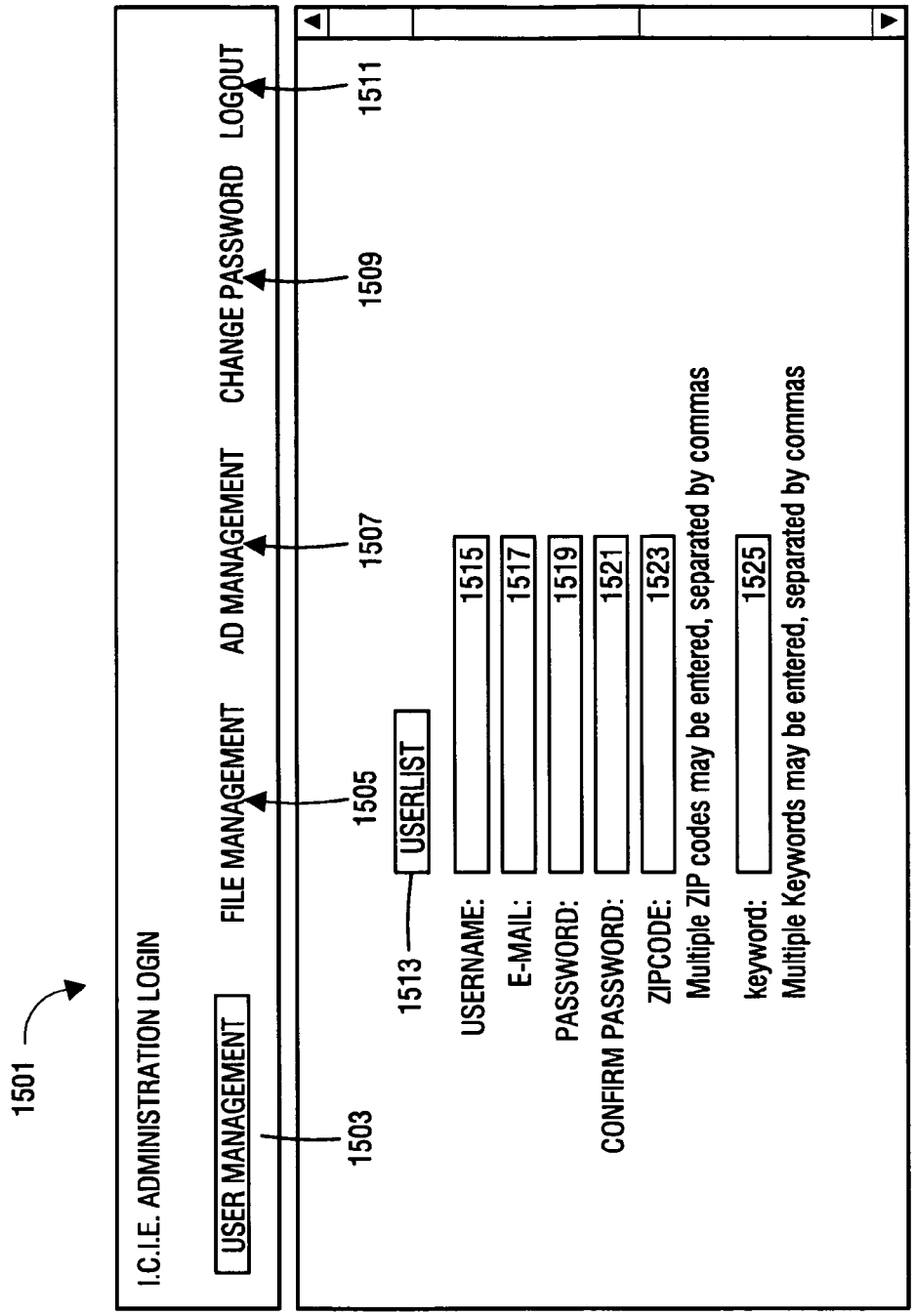
FIG. 15 illustrates an exemplary embodiment of a user management page found in the alert logic control panel, similar to the login page from FIG. 14.

FIG. 15 illustrates an exemplary interface of the control panel 1501 for the ICIE™ application, such as may be accessed from the administrator login page 1201, from FIG. 14. In particular, FIG. 15 illustrates the user management page 1503 that may be available for the ICIE™ administrator to manage user information. In addition to the user management page 1503, the control panel 1501 may also include a file management page 1505, an ad management page 1507, a change password page 1509, and a logout page 1511.

The user management page 1503 may be utilized for the ICIE™ administrator to specify settings to monitor web content reported from one or more users. In at least one exemplary embodiment, the user management page 1503 may include a users list option 1513, which may provide a list of usernames that are currently being utilized. The user management page 1503 may also contain a username field 1515 where the ICIE™ administrator may enter a username for a new user. Similarly, an email field 1517 may be configured to receive an email address for the new user. The user management page 1503 may also include a password field 1519 where the administrator may enter a corresponding password for the username entered in the username field 1515. In at least one nonlimiting example, the user management page 1503 may also contain a confirm password field 1521 where the ICIE™ administrator may re-enter the password from the password field 1519 to maintain the integrity of the entered settings.

Other options that may be available in the user management page 1503 include a zip code field 1523. The zip code field may be configured to receive one or more zip codes associated with the new user. While the zip code field 1523 may be one mechanism for determining user location, other techniques may also be utilized such as GPS, static IP address location and/or other location identifier techniques.

Also included in the nonlimiting example of FIG. 15 is a keyword setting field 1525, where the ICIE™ administrator may enter one or more keywords. The keyword field 1525 may be configured to receive one or more keywords that trigger a designation of suspicious and/or dangerous activity. As a nonlimiting example, keywords may include "suicide," "drugs," "sex," and/or other administrator defined keywords. Similarly, some embodiments may be configured to receive a threshold setting for determining a percentage of the keywords necessary in a communication to trigger a designation of suspicious activity (e.g., if 70% of keywords present and/or if 10 instances of keywords are present, contact the predetermined authorities, etc.). Further, some embodiments may be configured to receive keyword interpretations to distinguish between present usages of keywords. More specifically, the administrator may be provided with an option to indicate a difference between the word "drug," when used as a past tense version of the verb "drag" (e.g., I drug the carpet out of the room) versus use of the word "drug," as a noun (e.g., he will sell you the drug).

FIG. 16 illustrates an exemplary embodiment of a control panel 1601 for the ICIE™ application, further illustrating the file management page 1305, from FIG. 15. In particular, the file management page 1505 may be configured to provide options to allow the administrator to view the contents sent to the monitoring server 106a (and/or authority server 106b) when the user activates the ICIE™ application via the reporting option 911a (FIG. 5), 911b (FIG. 10), 911c (FIG. 11), 1305 (FIG. 13), and/or 1311 (FIG. 13). As illustrated in the nonlimiting example of FIG. 16, the data may be presented in table form, where an ID column 1603 may be used to select a particular entry. Similarly, a computer name column 1605 may provide names of computers that send data. A zip code column 1607 may provide zip codes for locations of client devices 102. An information column 1609 may provide a link that contains the 911 report 601 that the ICIE™ application generated. A hypertext markup language (HTML) file column 1611 may provide a link that contains the off-line version of the website that was believed to be suspicious. A time column 1613 may be configured to provide the time when the information was sent by the user. Additionally, a download column 1615 may provide a link that allows the administrator to download all data in a compressed format. Other information may be sent to the server 106a and/or 106b when the user activates the ICIE™ application.

Figure 17:
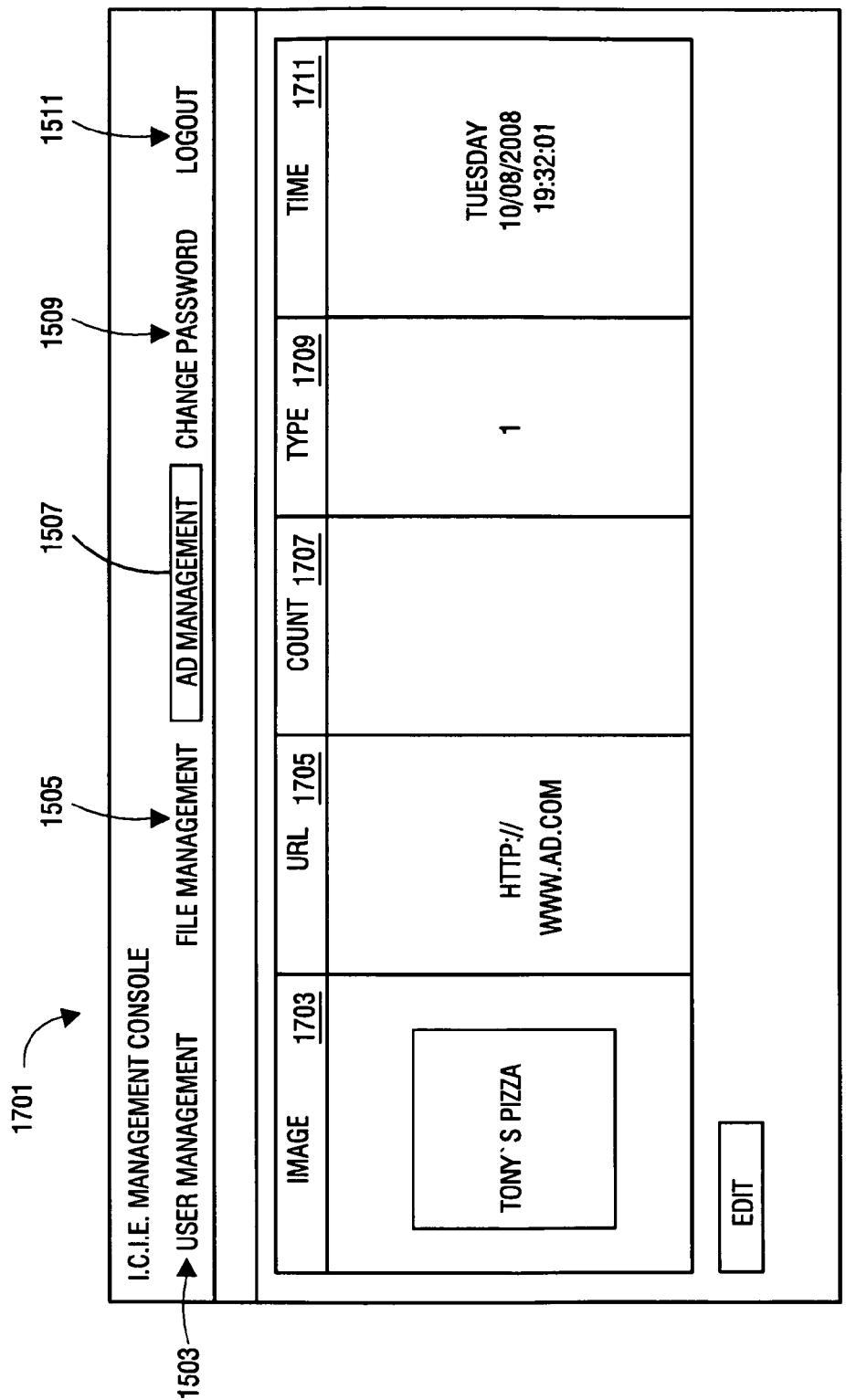
FIG. 17 illustrates an exemplary embodiment of an ad management page, similar to the ad management page from FIG. 16.

FIG. 17 illustrates an exemplary embodiment of the control panel 1701, further illustrating the ad management page 1307, from FIG. 13. In particular, the ad management page 1307 may be configured to provide options to manage advertisements associated with the ICIE™ application (e.g., advertisement tool 517 from FIG. 5 and/or advertisement 805 from FIG. 8, etc.). More specifically, the ad management page 1507 may include an image column 1703 that provides the advertisement seen on the client device 102, (e.g., advertisement tool 517 from FIG. 5). Similarly, a URL column 1705 may provide a uniform resource locator (URL) for the advertisement. A count column 1707 may be configured to provide data indicating a number of occurrences of the advertisement on the client device 102. A type column 1709 may be configured to provide a code indicating a characteristic for the advertisement. A time column 1711 may be configured to provide a time at which the advertisement was and/or will be uploaded to a user interface.

Figure 18:
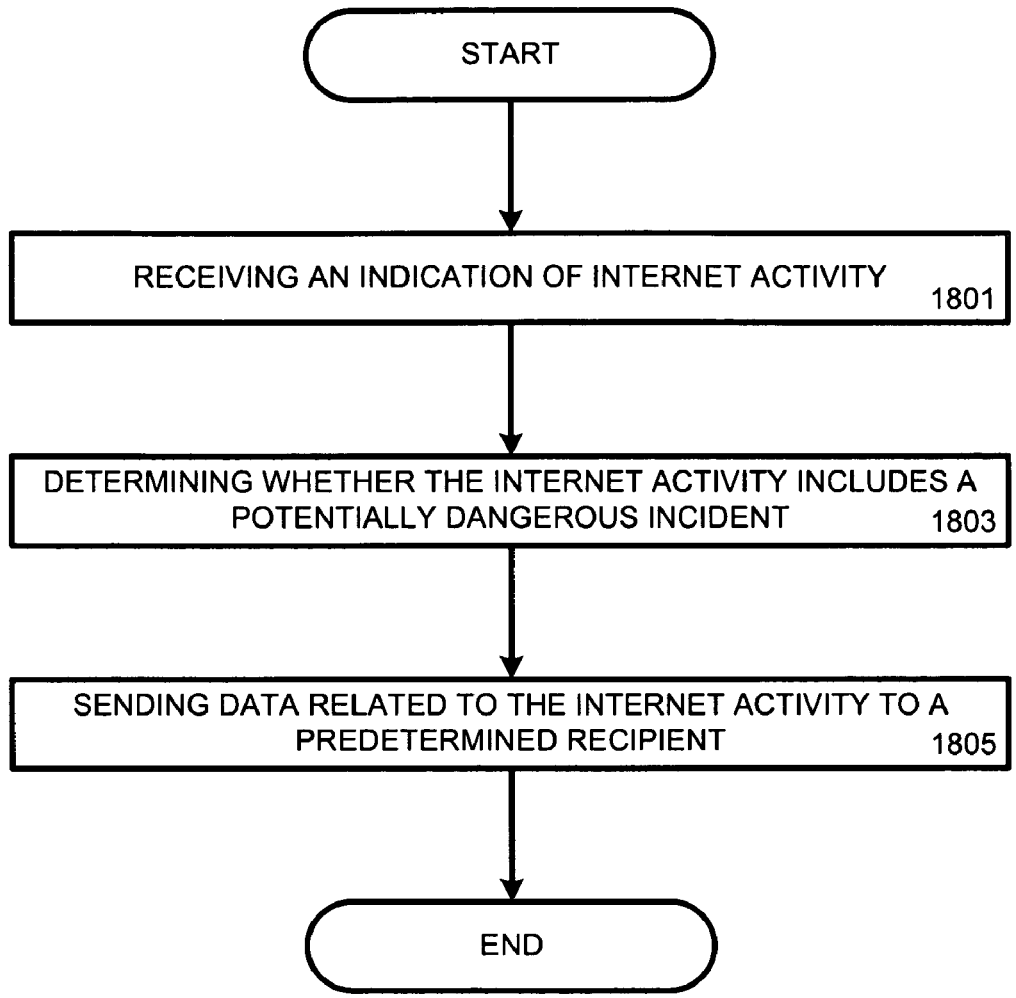
FIG. 18 depicts a flowchart illustrating an exemplary embodiment of a process for sending data related to Internet activity, such as via the reporting option, from FIG. 5.

FIG. 18 depicts a flowchart illustrating an exemplary embodiment of a process for sending data related to Internet activity such as may be performed by the server 106a from FIG. 1. More specifically, as illustrated in the nonlimiting example of FIG. 18, the server 106a may receive an indication of Internet activity (block 1801). The server 106a may then determine whether the Internet activity includes a potentially suspicious and/or dangerous activity (block 1803). The threshold is evaluated for the appropriate authorities, but not the parent/guardian. The server 106a may send data related to the Internet activity to a desired recipient (block 1805). The desired recipient may be a predetermined authority, parent, guardian, or other entity.

Figure 19:
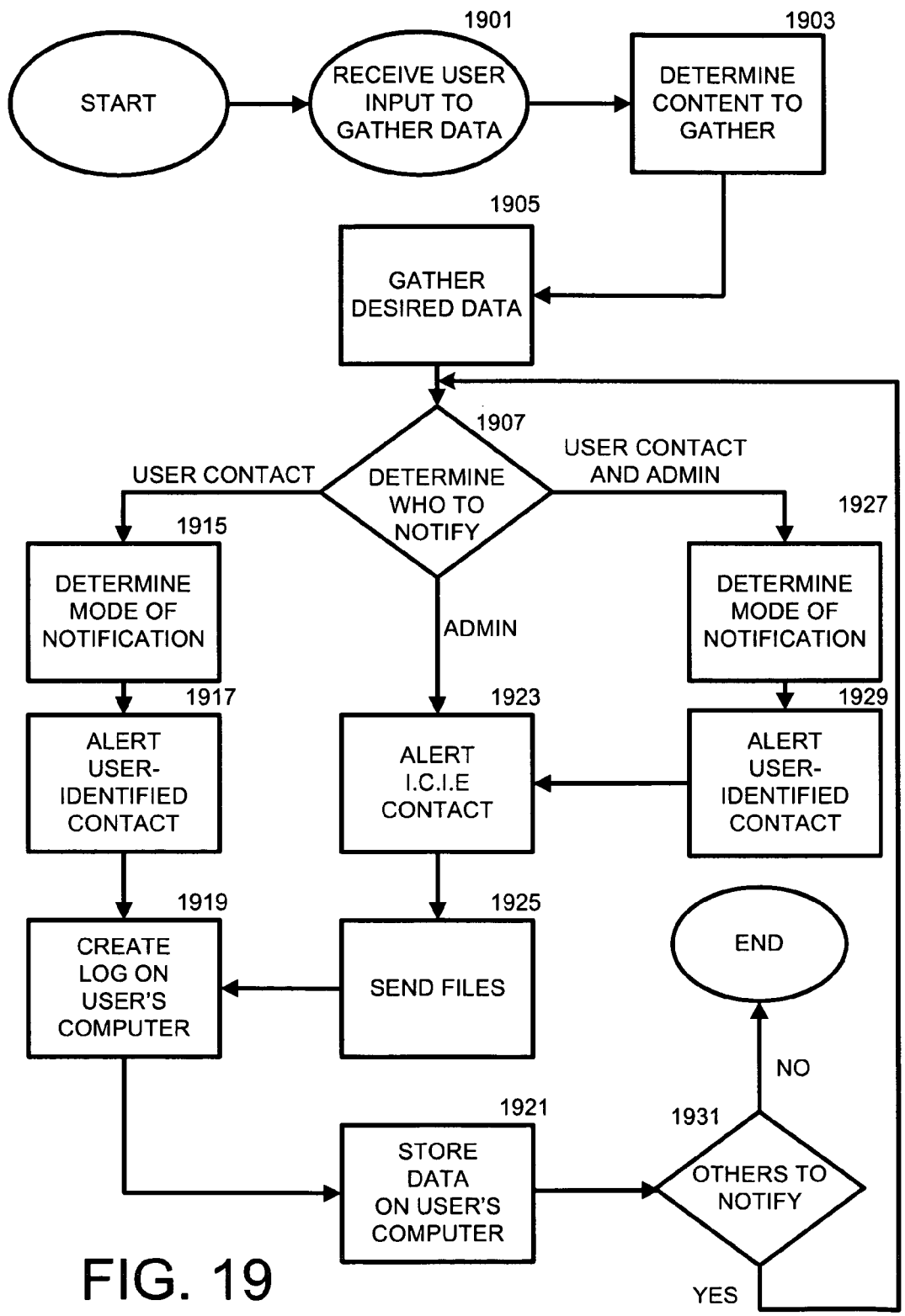
FIG. 19 depicts a flowchart illustrating another exemplary embodiment of a process for sending data related to Internet activity, similar to the flowchart from FIG. 18.

FIG. 19 depicts a flowchart illustrating an exemplary embodiment of a process for sending data associated with suspicious Internet activity to a predetermined recipient. In this nonlimiting example, the ICIE™ application may be triggered by the user (e.g., via selection of one or more of reporting options 911a, 911b, 911c, 1105, 1111) to gather data from the client device 102 (block 1901). In at least one embodiment, the ICIE™ application may execute in the background and may not require any user input to start gathering data for examination. Accordingly, in these embodiments, the ICIE™ application may automatically monitor the Internet activity and an indication of suspicious activity may trigger the ICIE™ application to execute. Once triggered, the ICIE™ application may then determine types of data to gather (block 1903). Data to be gathered may be determined based on user preferences established via the user interface 401, from FIG. 4. As a nonlimiting example, the user may indicate the types of data in the data collection section 421, (FIG. 4) and thus provide the desired information for the ICIE™ application to start gathering data (block 1905).

Additionally, the ICIE™ application may determine who to contact (block 1907). This determination may be made based on selections made in the sender list 405 of FIG. 4. More specifically, depending on the predetermined settings, the ICIE™ application may contact the ICIE™ administrator (e.g., via the monitoring server 106a, and/or the authority server 106b), and/or a user contact (e.g., a parent, teacher, etc.).

In response to determining to notify the user contact, the ICIE™ application may determine a mode of notification to alert the user-identified contact (block 1915). As a nonlimiting example, the mode of notification may include one or more of the following: email, telephone call, cellular phone call, postal mail, fax message, SMS message, and/or other form of notification. Upon determining the mode of notification (block 1915), the ICIE™ application may alert the user-identified contact via the determined mode of notification (block 1917).

As a nonlimiting example, the preferred mode of notification may be via facsimile. The ICIE™ application may gather a fax number provided by the user (e.g., via interface 401 from FIG. 4), prepare an alert message indicating a circumstance for the alert, and/or transmit a fax to the provided fax number with the alert message as the content of the fax message. The notification sent to the user-identified contact may include one or more of the data types presented in the data collection section 421 of the user interface 401 (FIG. 4).

Upon alerting the user-identified contact (block 1919), the ICIE™ application may create a log of at least a portion of the actions performed by the ICIE™ application (block 1919). As a nonlimiting example, the log may include a text file accessible to the ICIE™ application that is updated with a description of the activity and a time stamp for when the activity occurred. As another nonlimiting example, the log may include an Internet file that is updated by the ICIE™ application. The Internet file may then be viewed by a user-identified contact and/or the ICIE™ administrator. Further, the log may include a name of one or more applications that were running when the ICIE™ application was triggered, a username used to log in to the client device 102, and/or a name of the website being viewed by the user when the ICIE™ application was triggered.

Further, the ICIE™ application may be configured to store a copy of data on the client device 102 (block 1921). In an exemplary embodiment, the data stored on the client device 102 include similar and/or the same data gathered from the client device 102 from block 1905. The data stored on the client device 102 may also include one or more types of data appearing in the data collection section 421 of the user interface 401 (FIG. 4). A determination can then be made regarding whether there are others to notify (block 1931).

Returning to block 1907, if the ICIE™ application determines that only the ICIE™ administrator is to be notified, the ICIE™ application may alert the ICIE™ administrator, where the notification may contain one or more of the data types presented in the data collection section 421 from FIG. 4 (block 1923). As discussed above, the notification may be made via email, text message, phone call, a fax message, and/or other notification mechanisms.

Upon alerting the ICIE™ administrator, the ICIE™ application may transmit the data gathered at block 1905 to the ICIE™ administrator for examination (block 1925). The data sent to the ICIE™ administrator may include one or more types of data appearing in the data collection section 421 of the user interface 401 (FIG. 4). Moreover, in at least one exemplary embodiment, this data may be sent in a compressed format to facilitate quicker transfer. Further, the data sent to the ICIE™ administrator may be sent by email and/or other form of web-based transfer.

Upon transmitting the data files, the flowchart may return to block 1919 for the ICIE™ application to create a log of activity performed from the point when the ICIE™ application was triggered. The ICIE™ application may store a copy of all data on the client device 102 (block 1921). In an exemplary embodiment, the data stored on the client device 102 may include the same data gathered from the client device 102 (block 1905). The data stored on the client device 102 may also include one or more types of data appearing in the data collection section 421 of the user interface 401 (FIG. 4).

Returning again to block 1907, if the ICIE™ application determines to alert both the user-identified contact and the ICIE™ administrator, the ICIE™ application may determine a mode of notification to alert the user-identified contact (block 1927). Similar to block 1915, the mode of notification may include one or more of the following: email, telephone call, cellular phone call, postal mail, fax message, SMS message, and/or any other form of notification.

Upon determination of the mode of notification (block 1927), the ICIE™ application may alert the user-identified contact (block 1929). As discussed above, the notification may be sent via email, fax, SMS, IM, and/or via other mechanisms. The ICIE™ application may then alert the ICIE™ administrator (blocks 1923, 1925). In at least one exemplary embodiment, the ICIE™ application may alert the ICIE™ administrator by an email message where the notification may contain one or more of the data types presented in the data collection section 421 of the user interface 401 (block 1923). As a nonlimiting example, the alert to the ICIE™ administrator may be a phone call, a fax message, and/or any form of web-based transmittal.

Upon alerting the ICIE™ administrator, the ICIE™ application may transmit the data gathered at block 1905 to the ICIE™ administrator for examination (block 1925). The data sent to the ICIE™ administrator may include one or more types of data appearing in the data collection section 421 of the user interface 401 (FIG. 4). Moreover, as discussed above, in at least one exemplary embodiment, this data may be sent in a compressed format to facilitate transfer.

Upon transmitting the data files, the ICIE™ application may create a log of activity performed from the point when the ICIE™ application was triggered (block 1919). As a nonlimiting example, the log may include a text file accessible only to the ICIE™ application that is updated with a description of the activity and a time stamp for when the activity occurred. As another nonlimiting example, the log may include an Internet file that is updated by the ICIE™ application, which may then be viewed by a user-identified contact and/or the ICIE™ administrator. Further, the log may include a name of the application that was running when the ICIE™ application was triggered, a username used to log in to the client device 102, and/or a name of the website being viewed by the user when the ICIE™ logic was triggered.

The ICIE™ application may also be configured to store a copy of data on the client device 102 (block 1921). In an exemplary embodiment, the data stored on the client device 102 may be the same (and/or similar) data gathered as that from the client device 102 at block 1905. The data stored on the client device 102 may also include one or more types of data appearing in the data collection section 421 of the user interface 401.

Figure 20:
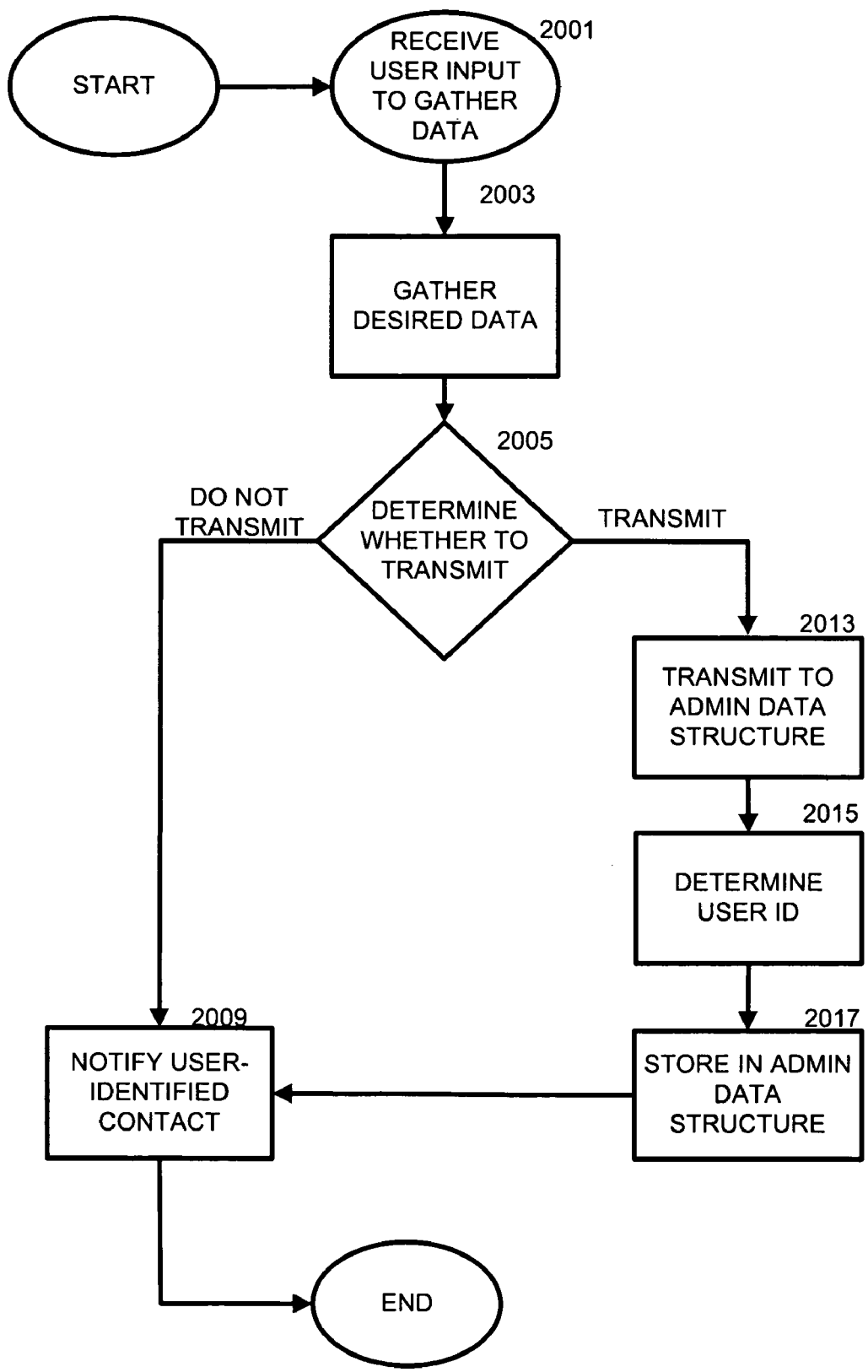
FIG. 20 depicts a flowchart illustrating an exemplary embodiment of a process that may be utilized for notifying a contact of Internet activity, similar to the flowchart from FIG. 19.

FIG. 20 depicts an exemplary embodiment of a process that may be utilized for notifying a contact of Internet activity, similar to the flowchart from FIG. 19. In this nonlimiting example, the ICIE™ application may be triggered by the user (e.g., via selection of reporting options 911a, 911b, 911c) to gather data from the client device 102 (block 2001). Once triggered, the ICIE™ application may begin to gather desired data (block 2003). Once the data is gathered, the ICIE™ application determines whether or not to transmit the gathered data (block 2005). This determination may, for example, be based on a preconfigured setting, stored user preferences, or a user-selected runtime option.

In response to a determination that data is not to be transmitted, the gathered data may not be transmitted to a remote server (e.g., server 106a, 106b). While in at least one embodiment, the gathered data may instead be stored on the client device 102, in at least one embodiment, the gathered data may be discarded. Additionally, in an exemplary embodiment, the data stored on the client device 102 may include the same (and/or similar) data as that gathered from the client device 102 at block 2003. As discussed above, the data may be summarized in a log, and may be stored in a compressed format. Additionally, a notification may be sent to the user-identified contact (block 2009).

Returning to block 2005, if the ICIE™ application determines to transmit the gathered data, the ICIE™ application may transmit the data gathered (block 2003) to the ICIE™ administrator for examination (block 2013). The data sent to the ICIE™ administrator may include one or more types of data appearing in the data collection section 421 of the user interface 401 (FIG. 4). Moreover, in at least one exemplary embodiment, this data may be sent in a compressed format to facilitate transfer through electronic means. Next, the ICIE™ application may determine the user ID of the sending user (block 2015). The user ID may, for example, be included with the gathered data. After the user ID is determined, the gathered data may be stored in an administration data structure (block 2017). The gathered data may be stored in a way so as to associate it with the user ID. After or during handling the data, an alert may be sent to notify a user-identified contact (block 2009). As discussed above, the mode of notification may include one or more of the following: email, telephone call, cellular phone call, postal mail, fax message, SMS message, and/or other form of notification.

Figure 21:
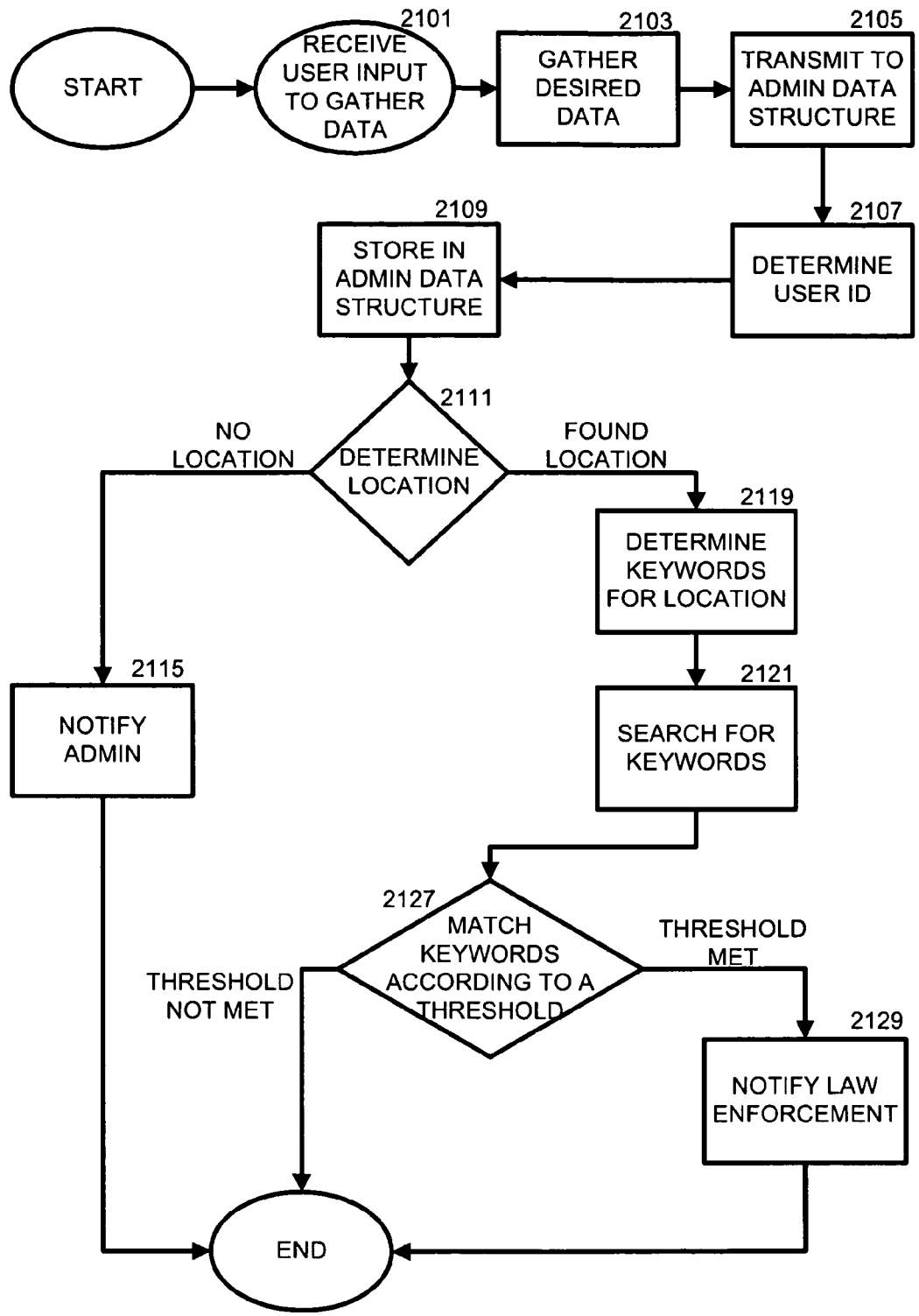
FIG. 21 depicts a flowchart illustrating an embodiment of a process for transmitting alert messages to only an ICIE™ administrator, similar to the flowchart from FIG. 20.

FIG. 21 is an illustration of an exemplary embodiment of a process for transmitting an alert message to an ICIE™ administrator. As illustrated in the nonlimiting example of FIG. 21, a user input may be received to gather data (block 2101). Once triggered, the ICIE™ application may then begin to gather desired data (block 2103). The ICIE™ application may be configured to transmit the data gathered to the ICIE™ administrator for examination (block 2105). The data sent to the ICIE™ administrator may include one or more types of data appearing in the data collection section 421 of the user interface 401 (FIG. 4). Moreover, in at least one exemplary embodiment, this data may be sent in a compressed format to facilitate transfer. Further, the data sent to the ICIE™ administrator may be sent by email and/or via other form of transfer. Similarly, in at least one embodiment, the ICIE™ application may determine the user ID of the sending user (block 2107). The user ID may be determined from the gathered data. After the user ID is determined, the gathered data may be stored in an administration data structure (block 2109). The gathered data may be stored in a way so as to associate the gather data with the user ID. As a nonlimiting example, the ICIE™ application may determine if a location has been received at the monitoring server 106a (block 2111). A location may be specified, for example, as a five-digit ZIP code. A database of ZIP codes may be consulted to determine whether a user-supplied ZIP code is a valid location.

If the ICIE™ application determines that the user-supplied location is invalid (e.g., no location), the ICIE™ application may notify the ICIE™ administrator (block 2115). Similarly, if at block 2111, the ICIE™ application determines that the user-supplied location is valid, the ICIE™ application may review a database for keywords and/or other clarifying marks associated with the given location (block 2119). The database may be coupled to and/or otherwise associated with the monitoring server 106a, the authority server 106b and/or other server. These keywords and/or other clarifying marks may, for example, indicate suspicious Internet activity. The keywords and/or other clarifying marks may, be provided in the keyword field 1325 of FIG. 13 and may be provided by law enforcement, the user, and/or other authority determined to serve the given location.

The contents of the gathered data may then be searched for the keywords (block 2121) to determine if any of the predetermined keywords match words and/or symbols in the gathered data. The number of keyword matches may then be determined and/or analyzed (block 2127). If, for example, no matches are found, and/or if the quantity of matches does not meet a predetermined threshold, then the communication may be considered benign and no action may be taken (in some embodiments, the ICIE administrator and/or the designated contact may be notified, but not law enforcement). If at block 2127, the given keywords are found within the gathered data and if, for example, the quantity of the keywords meets the predetermined threshold, a law enforcement agency and/or other authority may be notified, such as via the monitoring server 106a and/or authority server 106b (block 2129). Whether the authority is notified may depend on the quantity of keywords that match or the number of times a given matching keyword appears within the gathered data. Notification of the authority may be automatic, and/or it may be subject to review by an ICIE™ administrator.

One should note that in some embodiments the threshold may be determined from a percentage that is based on the number of keywords stored (e.g., determined by a particular police precinct) divided into the number of keywords found in a communication. As a nonlimiting example, if the words "drugs[5]," "die[1]," "dead[1]," and "kill[2]" are stored and the threshold is set to 75%, then each keyword is worth 25% for a total of 100%. This means that the term "die" must be found in a location 5 times to register as 25%. If the term "drugs" is not present 5 times in a particular communication, then that section will register as 0%. Similarly, "die" must be found once in the communication to register 25%. Similar analysis may be provided for other stored keywords. As discussed above, if the threshold is met, then the predetermined authority (e.g., via the authority server 106b) may be notified. Otherwise, the data may be recorded, but the authority server 106b may not be notified.

Figure 22:
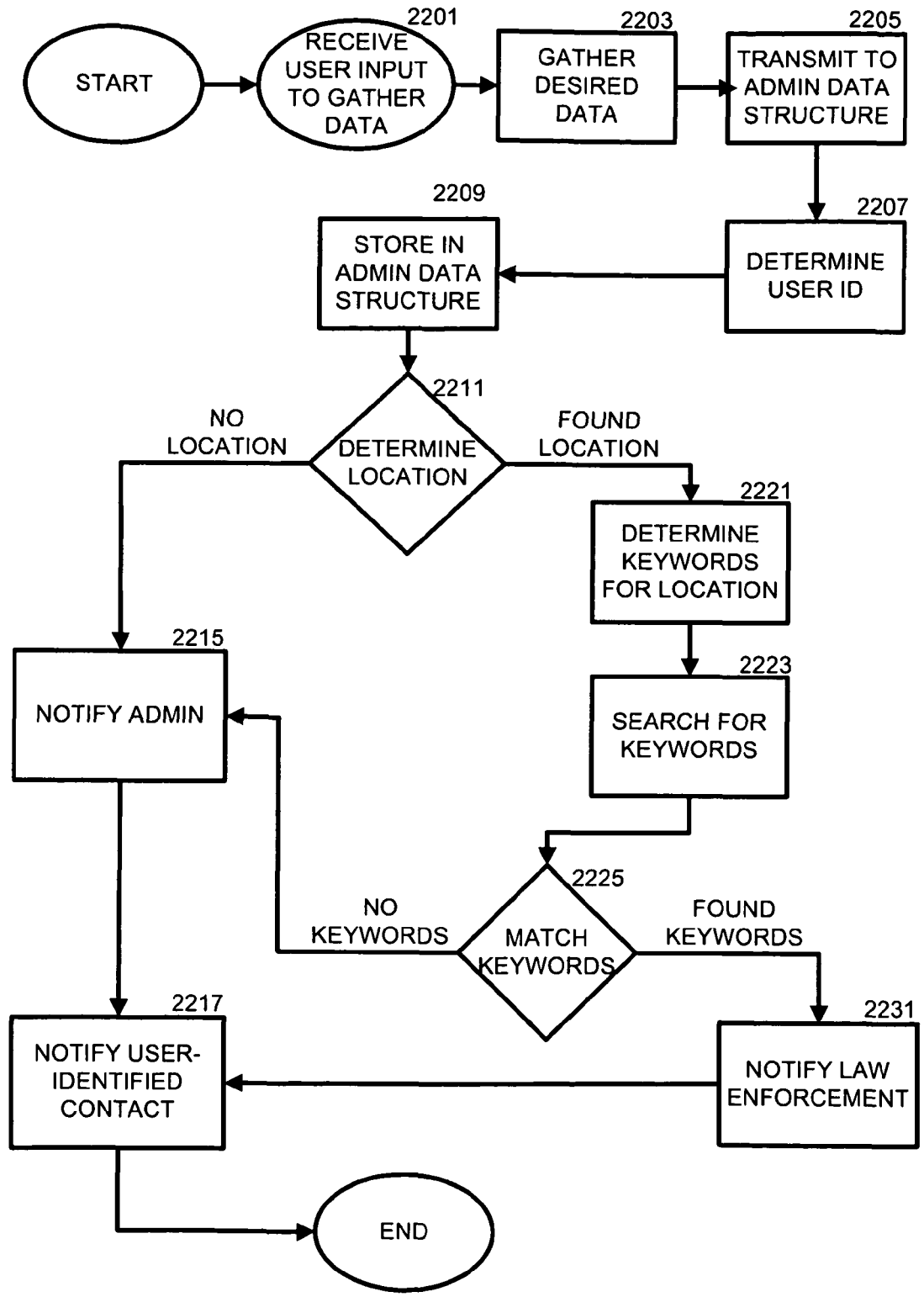
FIG. 22 depicts a flowchart illustrating an embodiment of a process for transmitting alert messages to both the user-identified contact and the ICIE™ administrator, similar to the flowchart from FIG. 21.

FIG. 22 is a flowchart illustrating an exemplary embodiment of a process for transmitting alert messages to both the user-identified contact and the ICIE™ administrator, similar to the flowchart from FIG. 21. In this nonlimiting example, the ICIE™ application may be triggered to gather data from the client device 102 (block 2201). As discussed above, the ICIE™ application may be triggered by a user and/or automatically. Once triggered, the ICIE™ application may gather data associated with the Internet activity of the user (block 2203). The ICIE™ application may transmit at least a portion of the gathered data to the ICIE™ administrator for examination (block 2205). The data sent to the ICIE™ administrator may include one or more types of data appearing in the data collection section 421 of FIG. 4. Next, in at least one embodiment, the ICIE™ application may determine the user ID of the sending user (block 2207). The user ID may, for example, be determined from the gathered data. After the user ID is determined, the gathered data may be associated with the determined user ID and stored in an administration data structure, such as may be provided by the monitoring server 106a (block 2209).

Additionally, the ICIE™ application may determine if a location has been received at the monitoring server 106a (block 2211). A location may be specified, for example, as the five-digit ZIP code indicated in FIG. 4. A database of ZIP codes may be consulted to determine whether a user-supplied ZIP code is a valid location (e.g., whether the zip code is monitored for suspicious activity).

If the ICIE™ application determines that the user-supplied location is invalid, the ICIE™ application may notify the ICIE™ administrator of the location for potential future monitoring and/or error detection (block 2215). The ICIE™ application may also notify the user-identified contact of the suspicious activity (block 2217). Returning to block 2211, in response to a determination that the user-supplied location is valid, the ICIE™ application may review a database for keywords and/or other clarifying marks associated with the given location (block 2221). These keywords and/or other clarifying marks may indicate suspicious Internet activity. As discussed above, the keywords and/or other clarifying marks may be provided by a law enforcement agency (e.g., provided by and/or associated with server 106b) or other authority determined to serve the given location. The contents of the gathered data may then be searched for matching keywords (block 2223). The number of keyword matches may then be determined and/or analyzed (block 2225).

If no matches are found, or if quantity of matches does not meet the predetermined threshold, the ICIE™ application may notify the ICIE™ administrator that a report of suspicious activity has been made, but it was determined that the Internet activity is benign (block 2215). The ICIE™ application may also notify a user-identified contact of the report (block 2217).

If at block 2225, keywords are found in the gathered data and/or the quantity of keywords found meets the predetermined threshold, a law enforcement agency and/or other authority (e.g., via authority server 106b) may be notified of the suspicious activity (block 2231). Additionally, depending on the particular configuration, at least a portion of the data used to identify and/or determine the suspicious activity is also sent to the authority. As discussed above, notification of the authority (e.g., via server 106b) may be automatic, and/or may be subject to review by an ICIE™ administrator.

The embodiments disclosed herein can be implemented in hardware, software, firmware, or any combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order depicted herein and/or not at all. For example, two blocks shown in succession may, in fact, be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A system for notification of suspicious electronic activity, comprising:
    an alert application executable on a client device, the alert application having an option operative to send an indication of suspicious electronic activity responsive to actuation by a user of the client device; and
    at least one server that stores a notification application executable on the at least one server, the at least one server being operative to communicate with the client device, the notification application configured to perform at least the following:
        receive the indication of suspicious electronic activity from the client device responsive to actuation of the alert application option, the client device being associated with a current location at which the client device is located;
        gather data related to the suspicious electronic activity and the client device;
        receive, from a first party, at least a first key word associated with a first location and, from a second party, at least a second key word associated with a second location, the first key word being different from the second key word;
        determine that the current location of the client device is associated with the second location;
        calculate a frequency of appearance of at least the second keyword within the data;

determine whether the data is related to a suspicious activity based on the frequency of appearance and a predetermined threshold; and notify at least the second party of the suspicious activity.

2. The system of claim 1, wherein the predetermined threshold is determined based, at least in part, on the current location.

3. The system of claim 1, wherein the predetermined threshold is determined by the user.

4. The system of claim 1, wherein the system is further configured to notify another party of the suspicious activity, the another party being specified, via the alert application, by the user.

5. The system of claim 1, wherein the current location is identified by a zip code.

6. The system of claim 1, wherein the option is provided via a web browser.

7. The system of claim 1, wherein the option is provided via an instant messaging application.

8. The system of claim 1, wherein the option is provided via an email application.

9. The system of claim 1, wherein the option is provided via a desktop application.

10. The system of claim 1, wherein the alert application is further configured to send a link to a third party through the instant messaging application, the third party being associated with the suspicious activity, the link representing a URL of a web server application designed to capture IP address data of the third party.

11. The system of claim 1, wherein the client device is a telephone.

12. The system of claim 1, wherein the client device is a personal computer.

13. The system of claim 1, wherein the option is an actuatable icon on a graphical user interface displayed on the client device.

* * * * *